United States Patent
Luo et al.

(10) Patent No.: US 11,876,722 B2
(45) Date of Patent: Jan. 16, 2024

(54) DELAY BOUNDS FOR SCHEDULING PRIORITY AND PACKET DISCARD IN AN INTEGRATED ACCESS AND BACKHAUL NETWORK

(71) Applicant: QUALCOMM Incorporated, San Diego, CA (US)

(72) Inventors: Jianghong Luo, Skillman, NJ (US); Karl Georg Hampel, Hoboken, NJ (US); Navid Abedini, Basking Ridge, NJ (US); Naeem Akl, Somerville, NJ (US); Tao Luo, San Diego, CA (US); Luca Blessent, Whitehouse Station, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/394,331

(22) Filed: Aug. 4, 2021

(65) Prior Publication Data
US 2022/0070104 A1 Mar. 3, 2022

Related U.S. Application Data

(60) Provisional application No. 63/072,731, filed on Aug. 31, 2020.

(51) Int. Cl.
*H04L 47/32* (2022.01)
*H04W 88/18* (2009.01)

(52) U.S. Cl.
CPC ............ *H04L 47/32* (2013.01); *H04W 88/18* (2013.01)

(58) Field of Classification Search
CPC .............................. H04L 47/32; H04W 88/18
See application file for complete search history.

(56) References Cited

FOREIGN PATENT DOCUMENTS

| WO | 2020029196 A1 | 2/2020 | |
|---|---|---|---|
| WO | WO-2020029196 A1 * | 2/2020 | ........ H04W 28/0252 |

OTHER PUBLICATIONS

International Search Report and Written Opinion—PCT/US2021/044813—ISA/EPO—dated Dec. 1, 2021.

(Continued)

*Primary Examiner* — Jianye Wu
(74) *Attorney, Agent, or Firm* — Arun Swain

(57) ABSTRACT

A method, a computer-readable medium, and an apparatus are provided for wireless communication at an integrated access and backhaul (TAB) node. The TAB node receives a first delay parameter and a second delay parameter associated with a packet, the first delay parameter being associated with a discard determination for the packet and the second delay parameter being associated with scheduling the packet for transmission. The TAB node performs a discard decision for the packet based on the first delay parameter associated or schedules the packet for transmission to a second TAB node or a user equipment (UE) using a second delay parameter associated with the packet. A central unit (CU) of an TAB network may indicate, to an TAB node, the second delay parameter for scheduling a packet and the first delay parameter for determining whether to discard the packet.

31 Claims, 16 Drawing Sheets

(56) References Cited

OTHER PUBLICATIONS

ZTE, et al., "Miscellaneous Enhancements for IAB Network", 3GPP Draft, R2-2007312, 3GPP TSG-RAN WG2 Meeting #111 electronic, 3rd Generation Partnership Project (3GPP), Mobile Competence Centre, 650, Route Des Lucioles, F-06921 Sophia-Antipolis Cedex, France, vol. RAN WG2, no. electronic, Aug. 17, 2020-Aug. 28, 2020, Aug. 7, 2020 (Aug. 7, 2020), XP051912080, 7 Pages, Retrieved from the Internet: URL:https://ftp.3gpp.org/tsg_ran/WG2_RL2/TSGR2_111-e/Docs/R2-2007312 zip , R2-2007312 [retrieved on Aug. 7, 2020] the Whole Document.

* cited by examiner

DELAY BOUNDS FOR SCHEDULING PRIORITY AND PACKET DISCARD IN AN INTEGRATED ACCESS AND BACKHAUL NETWORK

CROSS REFERENCE TO RELATED APPLICATION(S)

This application claims the benefit of and priority to U.S. Provisional Application Ser. No. 63/072,731, entitled "Delay Bounds for Scheduling Priority and Packet Discard in an Integrated Access and Backhaul Network" and filed on Aug. 31, 2020, which is expressly incorporated by reference herein in its entirety.

TECHNICAL FIELD

The present disclosure relates generally to communication systems, and more particularly, to wireless communication including an integrated access and backhaul (IAB) network.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at an IAB node. The IAB node apparatus receives a first delay parameter and a second delay parameter associated with a packet, the first delay parameter being associated with a discard determination for the packet and the second delay parameter being associated with scheduling the packet for transmission. The transmission of the packet may involve a period of time, e.g., with one or more retransmissions (such as hybrid automatic repeat request (HARQ) retransmission or radio link control (RLC) layer retransmissions. The IAB node discards the packet based on the first delay parameter associated with the packet or schedules the packet for transmission to a second IAB node or a user equipment (UE) using the second delay parameter associated with the packet. For example, the IAB node may discard the packet and stop the transmission in the middle of a transmission process, e.g., if the latency exceeds the first delay parameter. If the latency is less than the first delay parameter, the IAB node may schedule the packet for transmission based on the second delay parameter.

In another aspect of the disclosure, a method, a computer-readable medium, and an apparatus are provided for wireless communication of an IAB node. The apparatus receives a first delay parameter and a second delay parameter associated with a packet, the first delay parameter being associated with a discard determination for the packet and the second delay parameter being associated with scheduling the packet for transmission. The apparatus performs a discard decision based on the first delay parameter associated with the packet and schedules the packet for transmission to a second IAB node or a UE using the second delay parameter associated with the packet.

In another aspect of the disclosure, a method, a computer-readable medium, and an apparatus are provided for wireless communication for a central unit (CU) of an IAB network. The apparatus indicates, to an IAB node, a first delay parameter for determining whether to discard the packet and a second delay parameter for scheduling a packet. The apparatus sends the packet for transmission to a UE via one or more IAB nodes including the IAB node.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
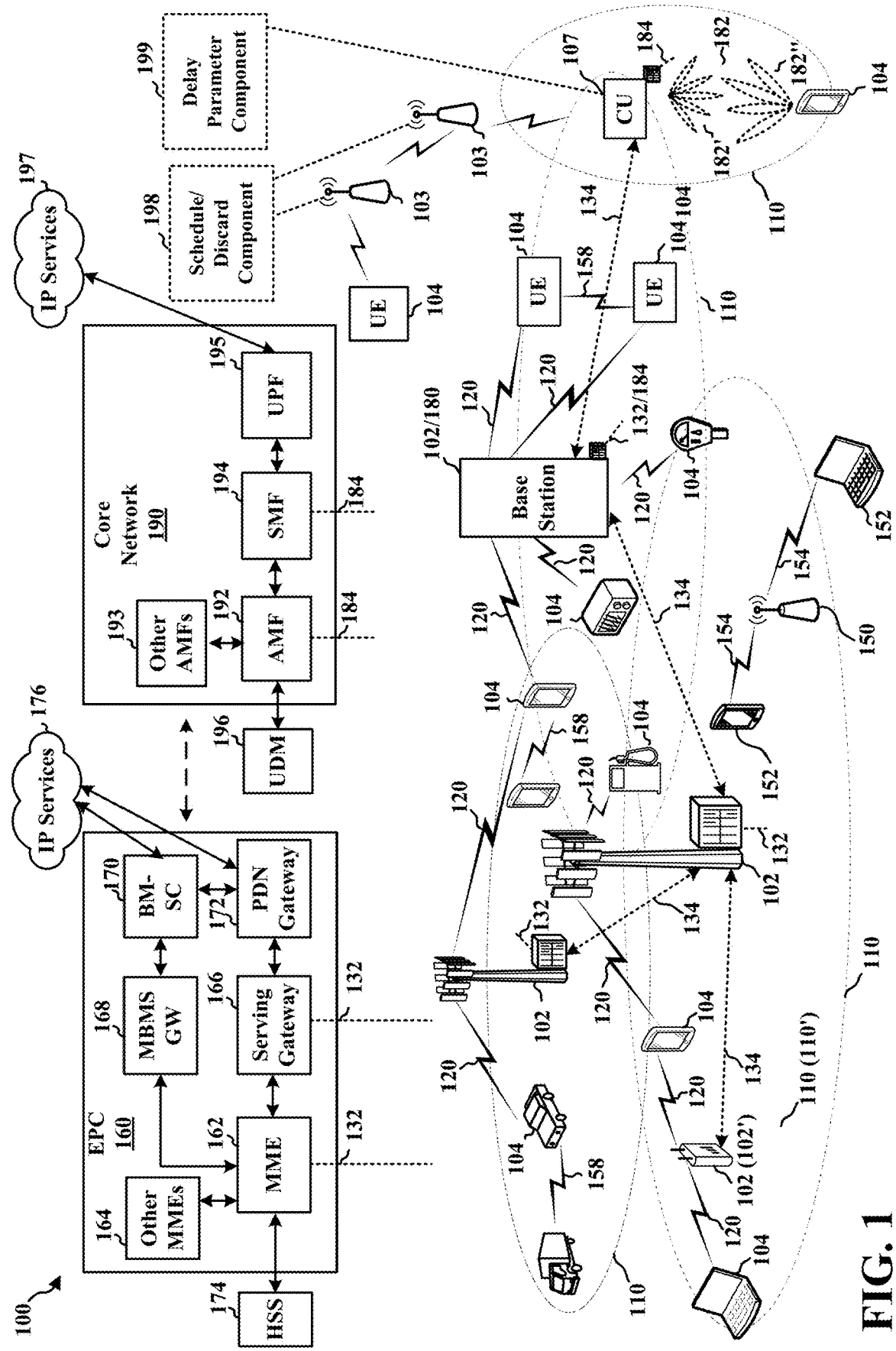
FIG. 1 is a diagram illustrating an example of a wireless communications system and an access network.

A packet delay budget (PDB) may define an upper bound for the time that a packet may be delayed between a UE and the User Plane Function (UPF) that terminates an N6 interface. The PDB may be a quality of service (QoS) characteristic. In an IAB network, one or more intermediate IAB nodes may provide a connection between an IAB node serving the UE and an IAB donor. A PDB per backhaul radio link control (RLC) channel may be provided to the intermediate IAB-DU. The PDB per backhaul RLC channel may provide an upper delay bound between an IAB distributed unit (DU) and a child mobile termination (MT), e.g., between DU of a parent IAB node and an MT of a child IAB node served by the parent IAB node. Thus, the PDB per backhaul RLC channel provides a delay bound for a single hop between IAB nodes. A PDB and core network (CN) PDB may be provided per DRB and per QoS flow to the serving IAB node of the UE without being provided to the intermediate nodes. The intermediate IAB node may not know the end-to-end PDB of a QoS flow that is aggregated to the backhaul RLC.

Aspects presented herein support QoS latency requirements, by providing multiple functions that may be applied at a scheduling node (e.g. a base station, a gNB-DU, or IAB-DU). The scheduling node may apply delay-aware scheduling to prioritize the scheduling decision and resource allocation among RLC channels. The RLC channels may be for different UEs/child MT or for the same UE/child MT. For example, an RLC channel with a lower PDB may be given a higher scheduling priority than another RLC channel with a larger PDB value. Additionally, the scheduling node may discard delay-expired packets using a discarding criteria to determine whether to discard a packet.

As presented herein, an IAB node may a first delay parameter and a second delay parameter associated with a packet, the first delay parameter being associated with a discard determination for the packet and the second delay parameter being associated with scheduling the packet for transmission. The transmission of the packet may involve a period of time, e.g., with one or more retransmissions (such as hybrid automatic repeat request (HARD) retransmission or RLC layer retransmissions. The IAB node discards the packet based on the first delay parameter associated with the packet or schedules the packet for transmission to a second IAB node or a UE using the second delay parameter associated with the packet. For example, the IAB node may discard the packet and stop the transmission in the middle of a transmission process, e.g., if the latency exceeds the first delay parameter. If the latency is less than the first delay parameter, the IAB node may schedule the packet for transmission based on the second delay parameter. The aspects of the present application may improve topology wide fairness, multi-hop latency, and congestion in an IAB network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., 1V1133 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the IAB node 103 may include a schedule/discard component 198 configured to receive a first delay parameter and a second delay parameter associated with a packet, the first delay parameter being associated with a discard determination for the packet and the second delay parameter being associated with scheduling the packet for transmission and to discard the packet using a first delay parameter associated with the packet or schedule the packet for transmission to a second IAB node or a UE 104 using a second delay parameter associated with the packet. A central unit (CU) 107 of an IAB network may include a delay parameter component 199 configured to indicate, to an IAB node 103, the second delay parameter for scheduling a packet and the first delay parameter for determining whether to discard the packet. The CU may send the packet for transmission to a UE 104 via one or more IAB nodes 103 including the IAB node.

Although the following description may be focused on 5G NR, the concepts described herein may be applicable to other similar areas, such as LTE, LTE-A, CDMA, GSM, and other wireless technologies.

Figure 2:
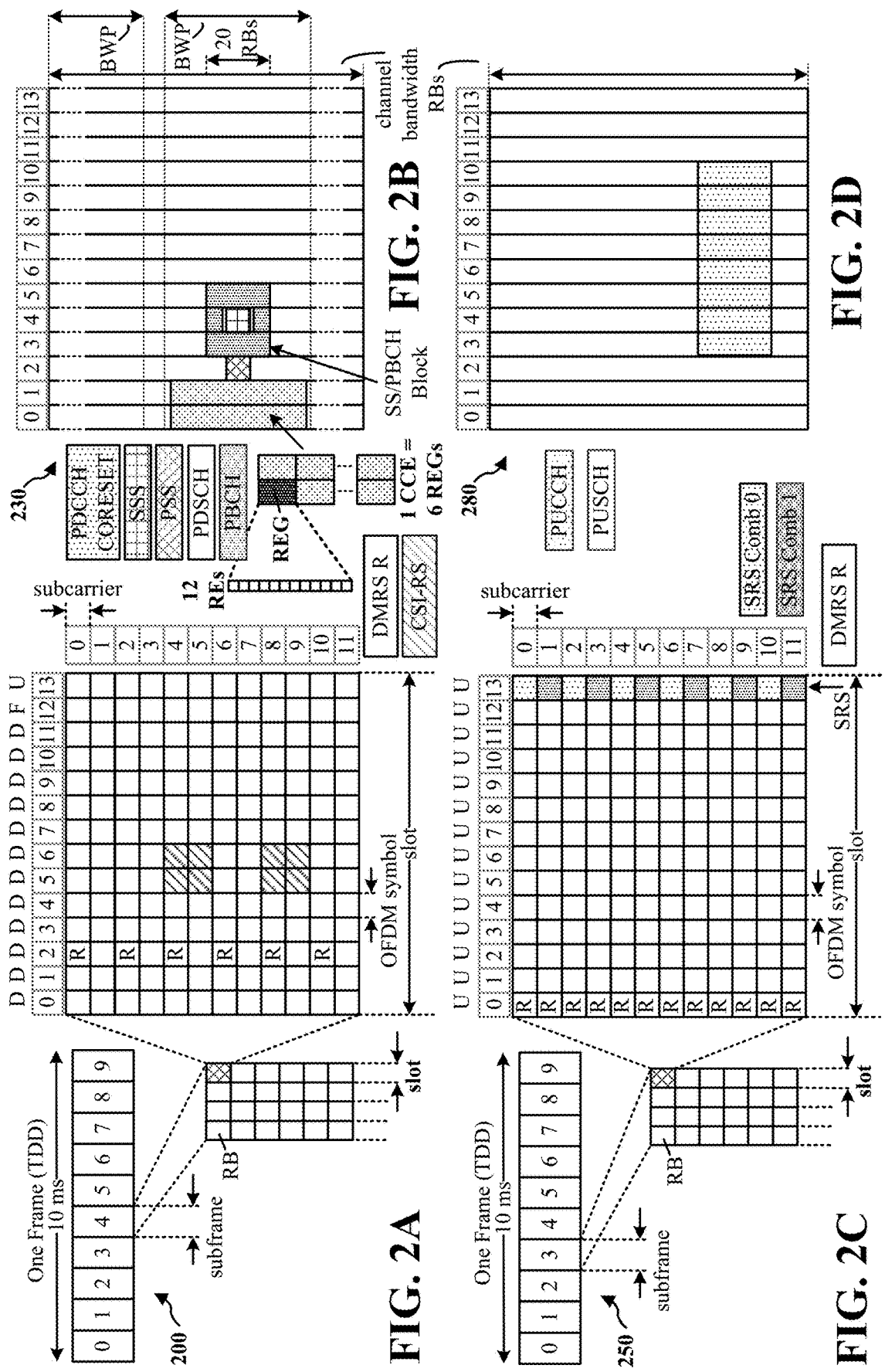
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). The description applies also to a 5G NR frame structure that is TDD.

FIGS. 2A-2D illustrate a frame structure, and the aspects of the present disclosure may be applicable to other wireless communication technologies may have different frame structures and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on the cyclic prefix (CP) is normal or extended. For normal CP, each slot may include 14 symbols, and for extended CP, each slot may include 12 symbols. The symbols on DL may be CP orthogonal frequency division multiplexing ((OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and CP. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (e.g., 14 symbols per slot), different numerologies μ 0 to 4 allow for 1, 2, 4, 8, and 16 slots, respectively, per subframe. For extended CP, the numerology 2 allows for 4 slots per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μt=0 has a subcarrier spacing of 15 kHz and the numerology μt=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
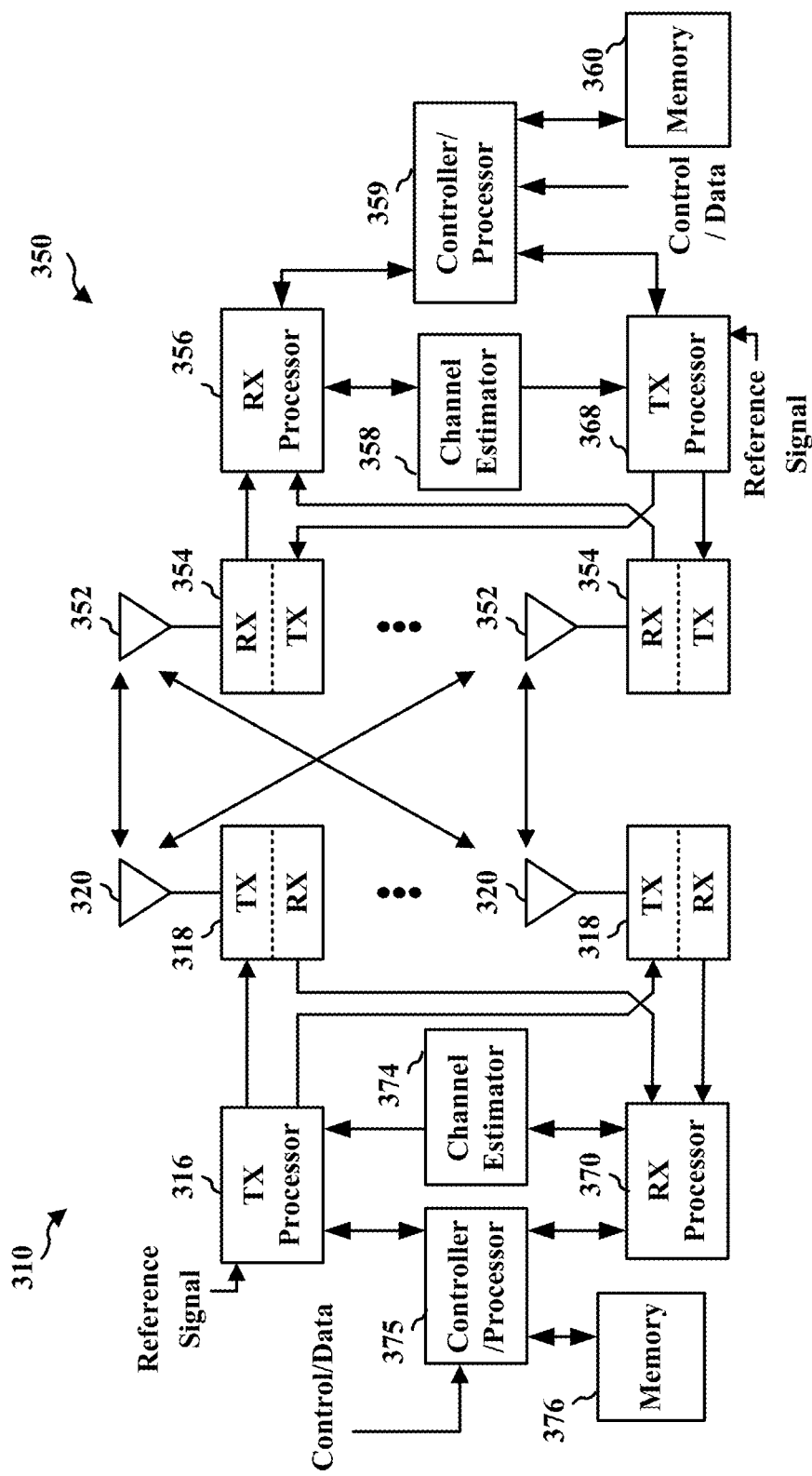
FIG. 3 is a diagram illustrating an example of wireless devices in an access network.

FIG. 3 is a block diagram of a wireless device 310 in communication with a wireless device 350 in an access network. In some examples, the device 310 may be an IAB donor, and the device 350 may be an IAB node. In some examples, the device 310 may be a parent IAB node, and the device 350 may be a child IAB node. the device 310 may be a parent IAB node, and the device 350 may be a UE. In the DL, IP packets from the EPC 160 or core network 190 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate an RF carrier with a respective spatial stream for transmission.

At the device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the device 310. These soft decisions may be based on channel estimates computed by the channel estimator 358. The soft decisions are then decoded and deinterleaved to recover the data and control signals that were originally transmitted by the device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the device 350. IP packets from the controller/processor 375 may be provided to the EPC 160 or core network 190. The controller/processor 375 is also responsible for error detection using an ACK and/or NACK protocol to support HARQ operations.

At least one of the TX processor 368, the RX processor 356, and the controller/processor 359 may be configured to perform aspects in connection with the schedule/discard component 198 of FIG. 1.

At least one of the TX processor 316, the RX processor 370, and the controller/processor 375 may be configured to perform aspects in connection with delay parameter component 199 of FIG. 1.

Figure 4:
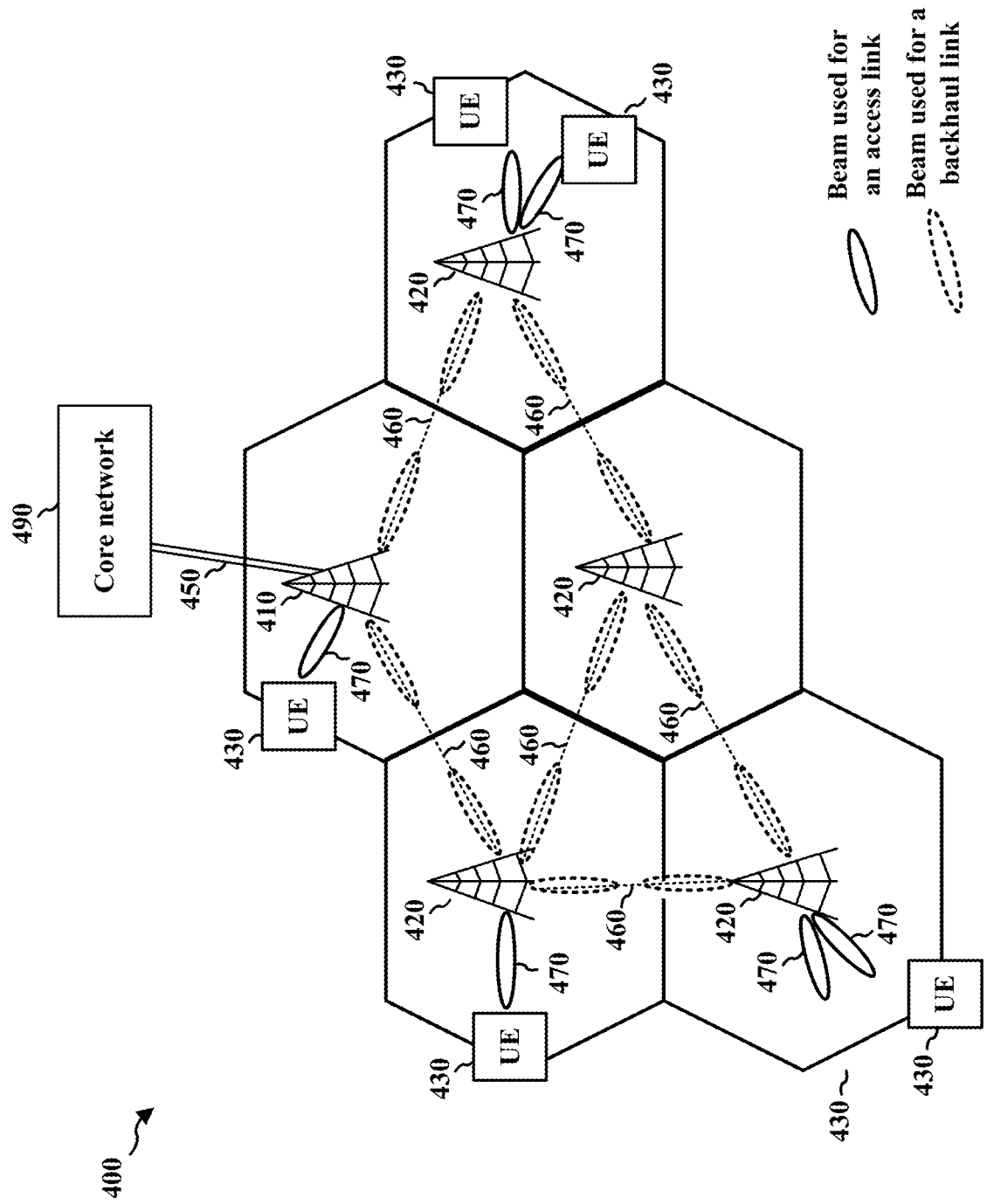
FIG. 4 illustrates an example IAB network.

FIG. 4 is a diagram illustrating an TAB network 400. The TAB network 400 may include an anchor node (that may be referred to herein as an "IAB donor") 410 and access nodes (that may be referred to herein as "TAB nodes") 420. The IAB donor 410 may be a base station, such as a gNB or eNB (such as base station 102 or 180 in FIG. 1), and may perform functions to control the TAB network 400. The TAB nodes 420 may comprise L2 relay nodes, etc. Together, the IAB donor 410 and the TAB nodes 420 share resources to provide an access network and a backhaul network to core network 490. For example, resources may be shared between access links and backhaul links in the TAB network.

UEs 430 interface with the TAB nodes 420 or the IAB donor 410 through access links 470. The TAB nodes 420 communicate with each other and with the IAB donor 410 through backhaul links 460. The IAB donor 410 is connected to the core network 490 via a wireline backhaul link 450. UEs 430 communicate with the core network by relaying messages through their respective access link 470 to the TAB network 400, which then may relay the message through backhaul links 460 to the IAB donor 410 to communicate to the core network through the wireline backhaul link 450. Similarly, the core network may communicate with a UE 430 by sending a message to the IAB donor 410 through the wireline backhaul link 450. The IAB donor 410 sends the message through the TAB network 400 via backhaul links 460 to the TAB node 420 connected to the UE 430, and the IAB node 420 sends the message to the UE 430 via the access link 470.

Each IAB node, e.g., including IAB donor 410 and each IAB node 420, may use a PCI value. The PCI value may serve as an identifier for that IAB donor 410 or IAB node 420. The PCI value may be used to determine a scrambling sequence that is applied to physical signals and/or channels that are transmitted by a particular IAB node. For example, a PSS and/or the SSS transmitted by the respective IAB donor 410 or IAB node 420 may be scrambled using a scrambling sequence that is based on the PCI used by the respective IAB node. A network may have a limited number of available PCI values. For example, 5G NR systems may support 1008 PCI values. Accordingly, a given PCI value may be reused in the same network.

Figure 5:
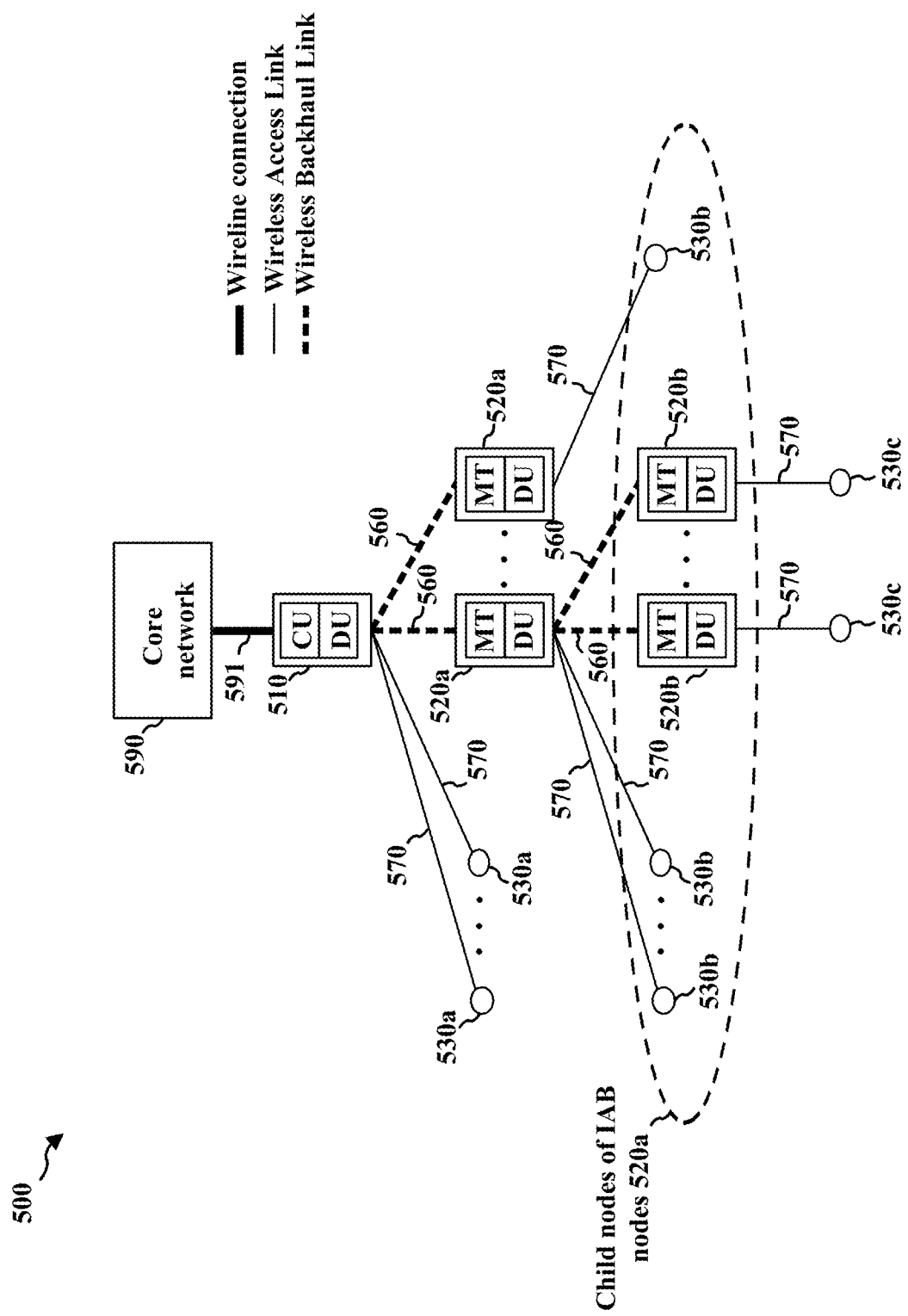
FIG. 5 illustrates examples aspects of an IAB network including a distributed unit (DU) function and a mobile termination (MT) function of IAB noes in the IAB network.

FIG. 5 is a diagram illustrating an IAB network 500 and components thereof. The IAB network 500 includes an IAB donor 510 and IAB nodes 520a, 520b. The IAB nodes, as well as the IAB donor, may provide wireless access links to UEs 530a-c.

The IAB donor 510 may be considered a root node of the tree structure of the IAB network 500. The IAB donor node 510 may be connected to the core network 590 via a wired connection 591. The wired connection may comprise, e.g., a wireline fiber. The IAB donor node 510 may provide a connection to one or more IAB nodes 520a. The IAB nodes 520a may each be referred to as a child node of the IAB donor node 510. The IAB donor node 510 may also provide a connection to one or more UE 530a, which may be referred to as a child UE of IAB donor 510. The IAB donor 510 may be connected to its child IAB nodes 520a via backhaul links 560, and may be connected to the child UEs 530a via access links 570. The IAB nodes 520a that are children nodes of IAB node 510 may also have IAB node(s) 520b and/or UE(s) 530b as children. For example, IAB nodes 520b may further connect to child nodes and/or child UEs. FIG. 5 illustrates IAB nodes 520b providing an access link to UEs 530c, respectively.

The IAB donor 510 may include a central unit (CU) and a distributed unit (DU). The central unit CU may provide control for the IAB nodes 520a, 520b in the IAB network 500. For example, the CU may be responsible for configuration of the IAB network 500. The CU may perform RRC/PDCP layer functions. The DU may perform scheduling. For example, the DU may schedule resources for communication by the child IAB nodes 520a and/or UEs 530a of the IAB donor 510.

The IAB nodes 520a, 520b may include a mobile termination (MT) and a DU. The MT of IAB node 520a may operate as a scheduled node, scheduled similar to a UE 530a by the DU of the parent node, e.g., IAB donor 510. The MT of IAB node 520b may operate as a scheduled node of parent node 520a. The DU may schedule the child IAB nodes 520b and UEs 530b of the IAB node 520a. As an IAB node may provide a connection to an IAB node that in turn provides a connection for another IAB node. The pattern of a parent IAB node comprising a DU that schedules a child IAB node/child UE may continue to more connections that illustrated in FIG. 5.

Figure 6:
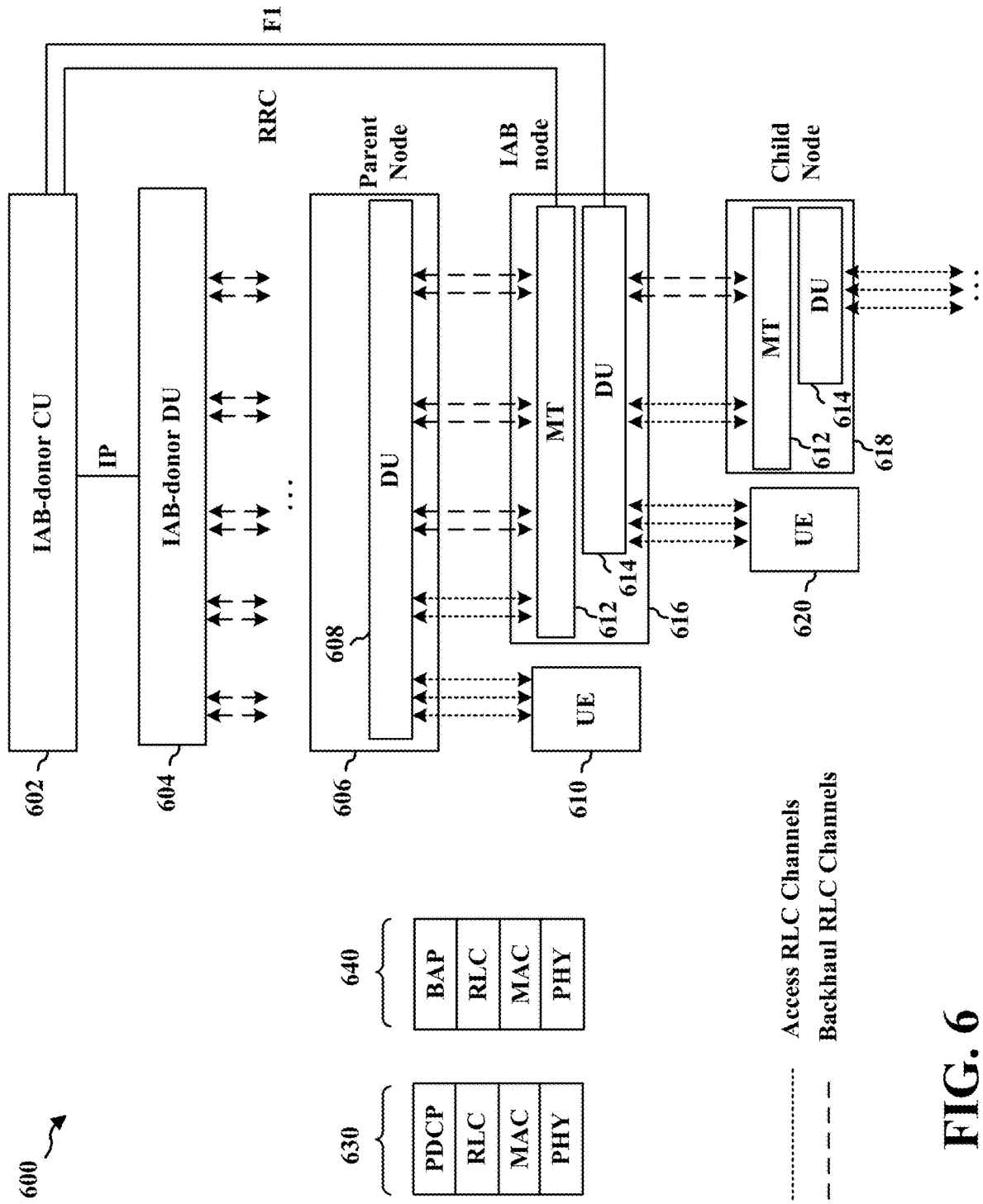
FIG. 6 illustrates an L2 structure of an IAB network.

FIG. 6 illustrates an example L2 structure 600 for an IAB network, such as the example IAB network in FIG. 5. The IAB donor CU 602 may have an IP connection to an IAB donor DU 604. The donor DU 604 may provide multiple RLC backhaul channels to one or more parent IAB nodes 606. The backhaul RLC channels between the DU and MT carry backhaul adaptation protocol (BAP) for backhauling of access traffic. The IAB node 606 may operate as a parent node to one or child nodes (e.g., IAB node 616) or UEs 610. The DU 608 of the IAB node 606 may provide an access RLC channel to one or more UEs 610 and/or MT 612 of an IAB node 616. The access RLC channels between the DU 608 and the UE 610 may carry PDCP for RRC or DRB. The access RLC channels between the DU 608 and the MT 612 may carry PDCP for RRC or DRB. The DU 608 of the IAB node 606 may provide backhaul RLC channels to the MT 612 of the IAB node 616. An access RLC channel protocol stack 630 is illustrated that shows the RLC layer with a PDCP layer, a MAC layer, and a PHY layer for an access link. A backhaul RLC channel protocol stack 640 is illustrated that shows the RLC layer with a BAP layer, a MAC layer, and a PHY layer for backhaul link. Similar to IAB node 606, the IAB node 616 may operate as a parent node to one or child nodes (e.g., IAB node 618) or UEs 610. The IAB node 616 may include a DU 614 that provides an access RLC channel to one or more UEs 620 and/or MT 612 of an IAB node 618 and/or that provides backhaul RLC channels to the MT 612 of the IAB node 618. The pattern may continue, and the IAB node 618 may serve additional child IAB nodes and/or UEs. The IAB node 606 may be referred to as an "intermediate node" or an "intermediate IAB node" between the IAB donor DU 604 and the IAB node 616 that serves UE 602. The IAB node 616 may be referred to as the "serving IAB node" or "serving node" for the UE 620.

Figure 7:
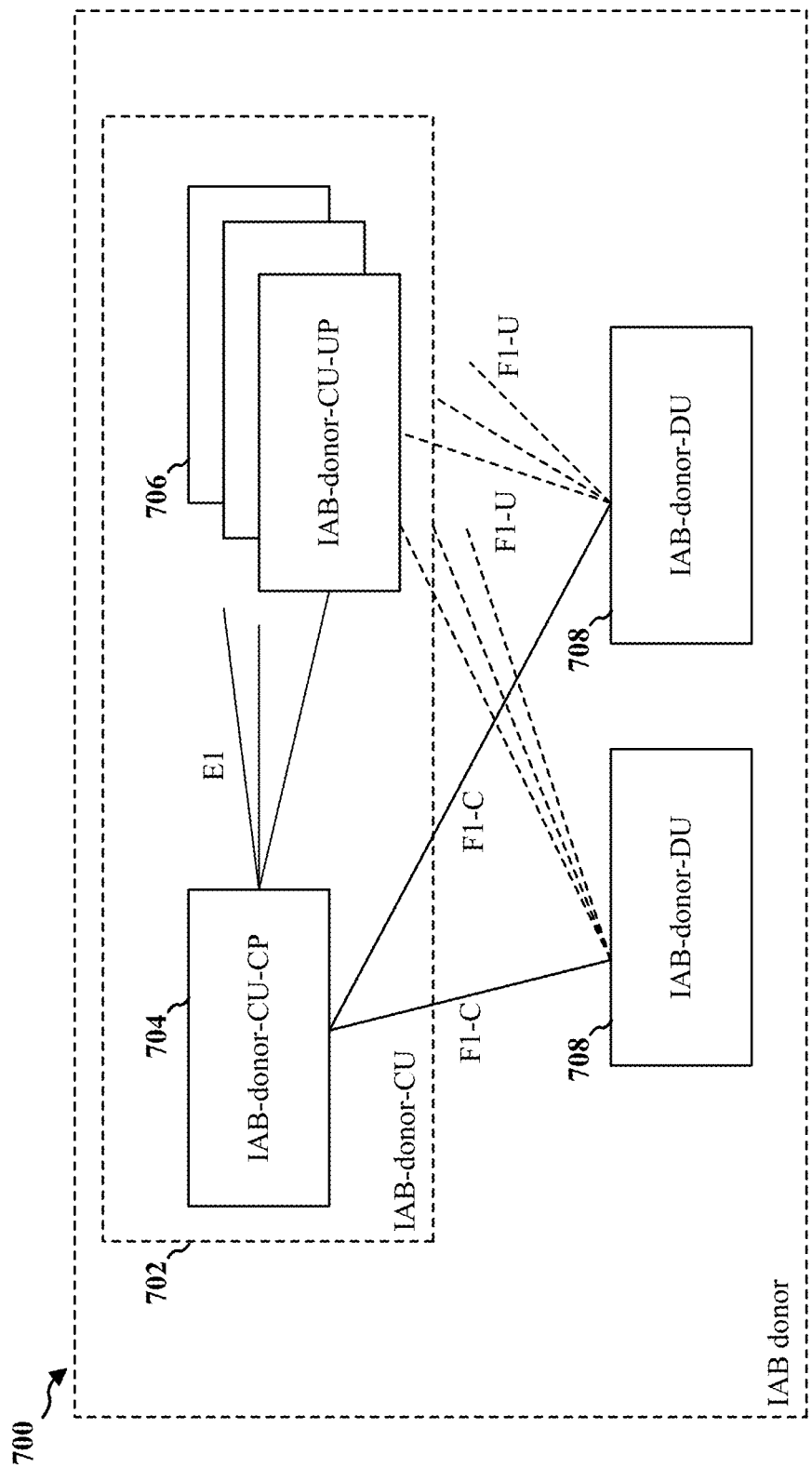
FIG. 7 illustrates an example architecture of an IAB donor.

FIG. 7 illustrates an overall architecture of an IAB donor 700 (i.e., IAB donor 510). Here, the IAB donor 700 may be a gNB of 5G/NR (i.e., gNB 180). The IAB donor 700 may include an IAB-donor-CU 702 and one or more IAB-donor-DUs 708. The IAB-donor-CU 702 may include an IAB-donor-CU-control plane (CP) (IAB-donor-CU-CP) 704 and one or more IAB-donor-CU-user planes (UPs) (IAB-donor-CU-UP) 706. The IAB-donor-CU-CP 704 may provide configuration controlling messages for all of the one or more IAB-donor-DUs 708. The IAB-donor-CU-UP 706 may transmit data packets from and to the IAB network (i.e., IAB network 500) through the IAB-donor-DU 708. The IAB-donor-CU-CP 704 and the one or more IAB-donor-CU-UPs 706 may communicate with each other through an E1 interface. The IAB-donor-CU-CP 704 and the one or more IAB-donor-DUs 708 may communicate with each other through an F1 control plane interface (F1-C). The IAB-donor-CU-UP 706 and the one or more IAB-donor-DUs 708 may communicate with each other through an F1 user plane interface (F1-U).

Figure 8:
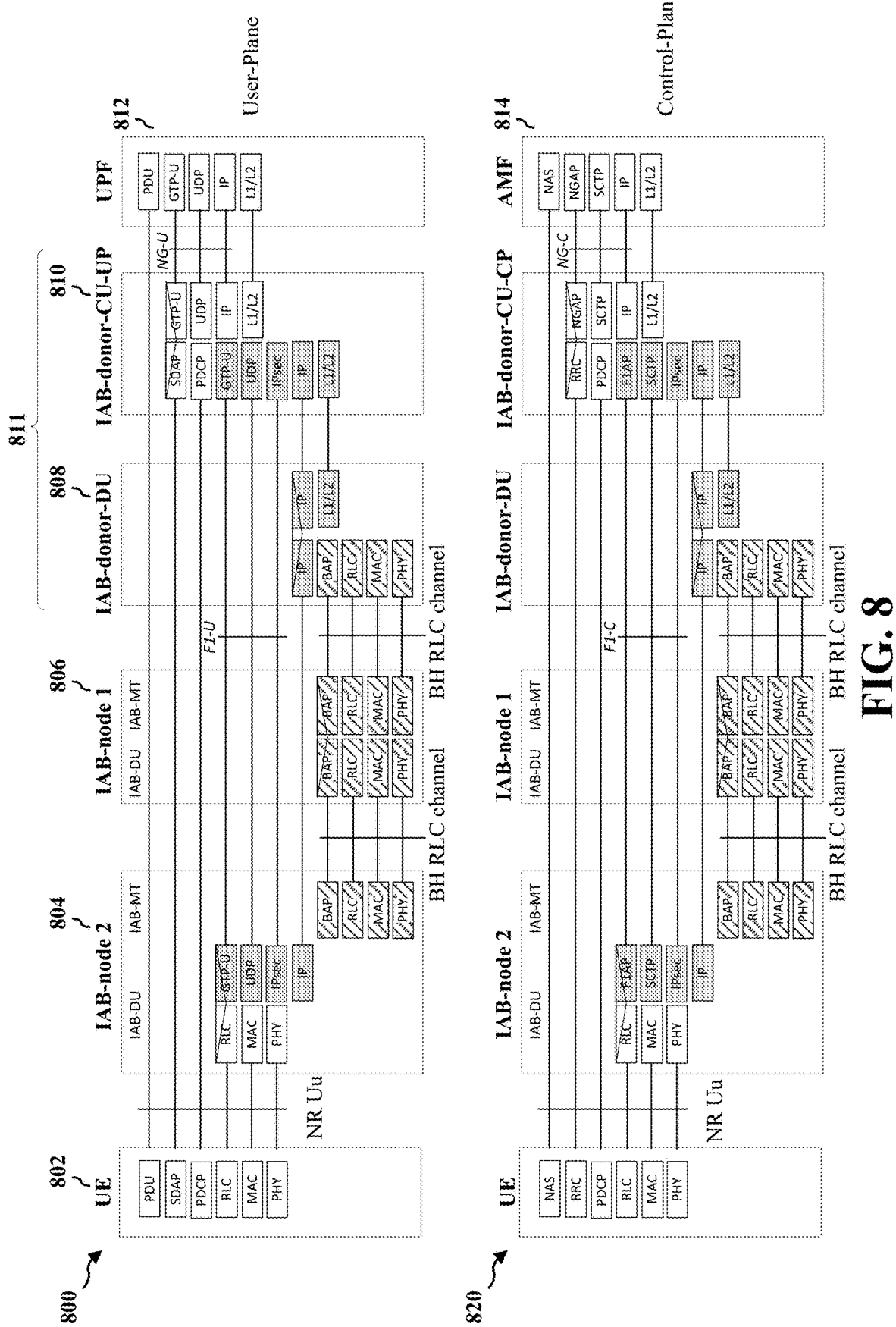
FIG. 8 illustrates a stack architecture of an IAB network.

FIG. 8 illustrates a stack architecture of the IAB network from a UE 802 (i.e., one or more UEs 530a/530b) to an IAB donor 811 (i.e., IAB donor 510/700). The stack architecture of the IAB network illustrates a stack architecture of the user plane 800 of the IAB network and a stack architecture of the control plane 8X0 of the IAB network. The stack architecture of the user plane 800 of the IAB network includes the stack structures of the user plane of the UE 802, an IAB-node 2 804, an IAB-node 1 806, an IAB-donor-DU 808, an IAB-donor CU-UP 810, and a user plane function (UPF) 812 of the core network. The stack architecture of the control plane 820 of the IAB network includes the stack structures of the control plane of the UE 802, an IAB-node 2 804, an IAB-node 1 806, an IAB-donor-DU 808, an IAB-donor CU-UP 810, and an access and mobility management function (AMF) 814 of the core network. Here, the IAB-node 2 804 connected to the UE 802 may be referred to as a serving IAB node 804. The IAB-node 1 806 provided along the path between the serving IAB node 804 and the IAB donor 811 may be referred to as an intermediate IAB node 806.

In some examples, the connection between the UE 802 and the serving IAB node 804 may be referred to as an NR link (the NR Uu interface), and the RLC channel between the UE 802 and the serving IAB node 804 may be referred to as an access RLC channel.

The UPF 812 of the core network and the IAB donor 811 may be connected to each other via an NG user plane interface (NG-U), and the AMF 814 of the core network and the IAB donor 811 may be connected to each other via an NG control plane interface (NG-C).

The intermediate IAB node 806 may provide a backhaul connection between the serving IAB-node 804 and the IAB donor 811. The RLC channel between the serving IAB node 804 and the IAB donor 811 via the intermediate IAB node 806 may be called a backhaul RLC channel.

The intermediate IAB node 806 may have backhaul layers configured to route the data packets between the IAB donor 811 and the serving IAB node 804. The data packets on the backhaul layers may have routing ID embedded in a backhaul adaptation protocol (BAP) header of the data packets, so that the data packets may be routed through the intermediate IAB node 806 between the IAB donor 811 and the target serving IAB node 804. The serving IAB 804 may receive data packets from and transmit data packets to the UE 802.

Although FIG. 8 illustrates that the IAB network includes one intermediate IAB node 806, aspects of the disclosure are not necessarily limited thereto, and the IAB network may include multiple intermediate IAB nodes. Accordingly, the IAB network may have more than one (1) paths between the serving IAB node 804 and the IAB donor 811 established via the multiple intermediate IAB nodes.

A Quality of Service (QoS) flow may provide a finest level of granularity of QoS differentiation in a protocol data unit (PDU) session. One or more QoS flows may be mapped to a data radio bearer (DRB), e.g., at an SDAP layer. Examples of QoS parameters include a 5G QoS indicator (5QI), a flow bit rate (e.g., for a guaranteed bit rate (GBR), an aggregation bit rate (e.g., per PDU session, per UE), an allocation and retention policy (ARP), among other examples. Examples of 5QI characteristics may include any of a type, a QoS priority level, a packet delay budget (PDB), a dynamically assigned 5QI, a packet error rate (PER), a delay critical indication, an averaging window, a maximum data burst volume, an extended packet delay budget, a core network (CN) PDB downlink, a CN PDB uplink, etc. The QoS information may be provided by a CU to a serving DU for a UE. For example, in FIG. 5, the CU of the donor IAB node 510 to a DU of IAB node 520b that is serving UE 530c. Similarly, the CU 602 in FIG. 6 may provide QoS information to the DU 608 that serves UE 610 or may provide QoS information to DU 614 of IAB node 616 that serves UE 620. The CU may provide the QoS information to the serving DU for a UE per DRB and per QoS flow, e.g., via an F1-AP message.

For example, a UE context setup message over an F1-AP may indicate a DRB to be set up with setup item information elements (IEs) that include a DRB identifier (ID), choice QoS information, and an E-UTRAN QoS. The set up IEs may further include DRB information including one or more of a DRB QoS, a Single Network Slice Selection Assistance Information (N-SSAI), or notification control. The setup IEs may further include a flow mapped to a DRB item including one or more of a QoS flow identifier, a QoS flow level QoS parameter, a QoS flow mapping indication, or time sensitive communication (TSC) traffic characteristics. A UE context setup message may indicate one or more backhaul RLC channel to be setup. The IEs for the backhaul RLC Channel to be set up may include one or more of a backhaul RLC channel ID, choice backhaul QoS information, an E-UTRAN backhaul RLC Channel QoS, a control plane traffic type, and RLC mode, a BAP control PDU channel, traffic mapping information, or a configured BAP address. The choice QoS characteristics may indicate one or more of a non-dynamic 5QI (e.g., with a non-dynamic 5QI descriptor), a dynamic 5QI (e.g., with a dynamic 5QI descriptor), a RAN ARP, GBR QoS flow information, reflective QoS attribute, a PDU session ID, an uplink PDU session aggregate maximum bit rate, or a QoS monitoring request. The QoS parameters may define the QoS to be applied to a QoS flow, to a DRB, or to a backhaul RLC channel. For a backhaul RLC channel, the IEs and the GBR QoS flow information IE may be applicable, where the GBR QoS flow information may be present if the backhaul RLC channel conveys the traffic belonging to a GBR QoS flow. A dynamic 5QI may indicate a QoS characteristics for a non-standardized or not-preconfigured 5QI for downlink and uplink communication. A non-dynamic 5QI may indicate the QoS characteristics for a standardized or preconfigured 5QI for downlink and uplink.

The PDB may define an upper bound for the time that a packet may be delayed between the UE and the UPF that terminates the N6 interface. In some examples, the PDB may be indicated in units of 0.5 ms. The extended PDB, CN PDB downlink or CN PDB uplink, may be indicated in units of 0.01 ms. For a backhaul RLC channel, the PDB may define an upper bound for the time that a packet may be delayed between an IAB-DU and its child IAB-MT. The PDB may be a QoS characteristic.

Figure 9:
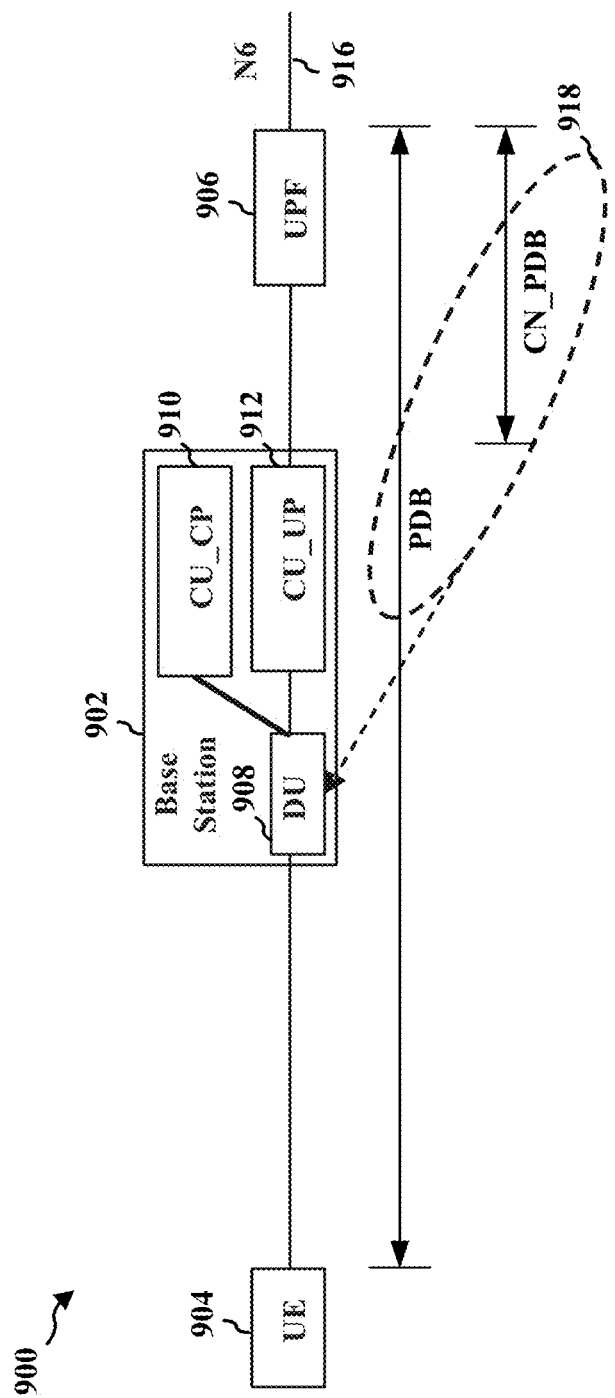
FIG. 9 illustrates examples aspects of a packet delay budget (PDB) for an access network.

FIG. 9 illustrates an example diagram 900 showing the PDB for delivering a packet between a UPF 906 terminating at an N6 interface 916 and a UE 904. FIG. 9 also illustrated a CN PDB between the UPF 906 and the access network 902. As illustrated, the access network 902 includes a DU 908 and a CU control plane (CU-CP) 910 and a CU user plane (UP) 912. The CN PDB may be a static value (e.g., non-dynamic) or may be dynamically configured by a CU via an F1-AP. As illustrated in FIG. 9 with the dashed line 918, the PDB and the CN PDB may be provided to the DU 908 per DRB and per QoS flow. For example, the PDB and CN PDB may be provided by the CU to the DU via an F1-AP.

The delay budget that applies to the radio interface may be determined by subtracting a static value for the CN PDB, which represents the delay between any UPF 906 terminating N6 916 (that may possibly be selected for the PDU Session) and the access network 902 from a given PDB. For GBR QoS flows using a delay-critical resource type, in order to obtain a more accurate delay budget PDB available for a RAN, a dynamic value for the CN PDB can be used, which represents the delay between the UPF 906 terminating N6 for the QoS flow and the access network 902. If used for a QoS flow, the RAN may apply the dynamic value for the CN PDB instead of the static value for the CN PDB, e.g., which may only be related to the 5QI. As an example, a static value for the CN PDB of 1 ms, 2 ms, 5 ms, etc. for the delay between a UPF terminating N6 and an access network may be subtracted from a given PDB to derive the packet delay budget that applies to the radio interface.

Figure 10:
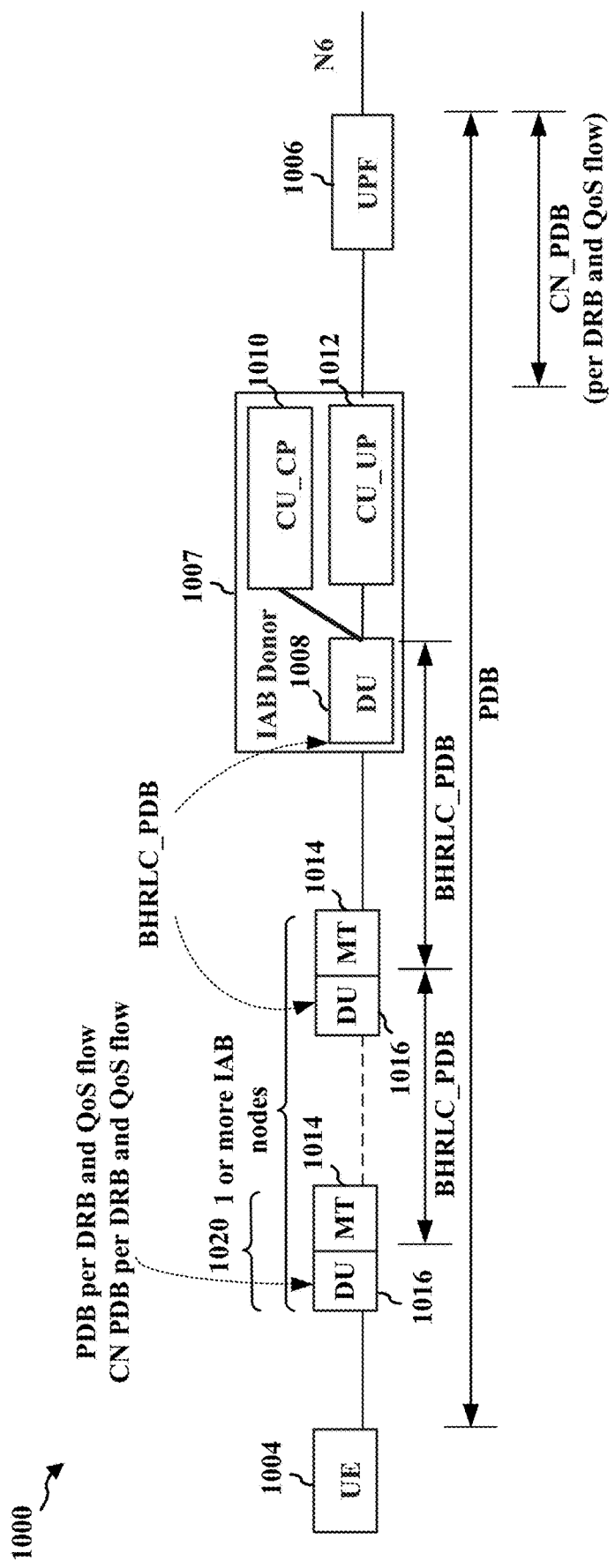
FIG. 10 illustrates example aspects of a PDB for an IAB network.

FIG. 10 illustrates an example of an IAB network 1000 including a UE 1004 that exchanges communication with the UPF 1006 via the IAB donor 1007 having a CU CP 1010, a CU UP 1012, and a DU 1008. One or more intermediate IAB nodes may provide a connection between the IAB node 1020 serving the UE 1004 and the IAB donor 1007. Each IAB node may include a DU 1016 and an MT 1014, e.g., as described in connection with FIGS. 5 and 6. A PDB per backhaul RLC channel may be provided to the intermediate IAB-DU. The PDB per backhaul RLC channel may provide an upper delay bound between an IAB DU and a child MT, e.g., between DU 1016 of a parent IAB node and an MT 1014 of a child IAB node served by the parent IAB node. Thus, the PDB per backhaul RLC channel (illustrated at "BHRLC_PDB" in FIG. 10) only provides a delay bound for a single hop between IAB nodes. The PDB and CN PDB may be provided per DRB and per QoS flow to the serving IAB node 1020 of the UE 1004, e.g., without being provided to the intermediate nodes. The PDB and CN PDB may be provided to the serving IAB node 1020 similar to the example described in FIG. 9, e.g., from the CU (e.g., CU-CP 1010) of the IAB donor 1007 to the DU 1016 of the serving IAB node 1020. The CU may only indicate a one-hop PDB (e.g., the backhaul RLC PDB) to an intermediate IAB node DU. The intermediate IAB node may not know the end-to-end PDB of a QoS flow that is aggregated to the backhaul RLC.

As described herein, in order to support QoS latency requirements, multiple functions may be applied at a scheduling node (e.g. a base station, a gNB-DU, or IAB-DU). As a first aspect, the scheduling node may apply delay-aware scheduling to prioritize the scheduling decision and resource allocation among RLC channels. The RLC channels may be for different UEs/child MT or for the same UE/child MT. For example, an RLC channel with a lower PDB may be given a higher scheduling priority than another RLC channel with a larger PDB value.

Additionally, the scheduling node may apply discarding of delay-expired packets using criteria to determine whether to discard a packet. As an example, for GBR QoS Flows with a delay critical GBR resource type, a packet which is delayed more than the PDB is counted as lost, and included in the PER unless the data burst is exceeding the maximum data burst volume (MDBV) within the period of PDB or the QoS Flow is exceeding the GBR. For example, the maximum number of transmissions for a MAC HARQ entity and/or for an AM-RLC entity may be determined based on the PDB or (PDB—CN PDB), so that a TX node may give up HARQ and/or RLC retransmission when the packet delay exceeds the bound or threshold (e.g., the PDB or the PDB—CN PDB).

For an access network with a single hop, such as illustrated in FIG. 9, these two functions can be determined based on the same end-to-end delay bound, e.g. (PDB—CN PDB).

However, for a multi-hop network, e.g. the IAB-network illustrated in any of FIG. 4, 5, 6, 8, or 10, the two functions may be determined based on different types of delay bounds. For example, the scheduling priority among different RLC channels at one hop may be determined based on a target delay budget assigned for this hop (e.g., a one-hop-PDB such as the BHRLC_PDB illustrated in FIG. 10). However, a packet exceeding a one-hop-PDB may not be discarded at an intermediate hop, because this packet may still be able to meet the end-to-end PDB by using less latency than the target one-hop-PDB at later hops. Aspects presented herein provide a way to discard a packet at an intermediate hop, e.g., if the packet already exceeds the end-to-end delay budget.

As described in connection with FIG. 10, a single delay bound, e.g., a backhaul RLC PDB or a one hop delay bound, may be indicated to intermediate IAB nodes for a backhaul RLC in an IAB network. The end-to-end delay budget (e.g., the PDB and CN PDB) for a QoS flow may only be known by the donor CU-CP and the serving IAB node for an access RLC, but not by the intermediate IAB nodes for a backhaul RLC. Using the one hop backhaul RLC PDB that is known by the intermediate IAB nodes for the backhaul RLC for both scheduling and packet discarding may lead to discarding packets that could still achieve the end-to-end PDB. In some examples, the intermediate IAB nodes may use the one hop delay bound, e.g., the backhaul RLC PDB for scheduling priority of a packet and may not perform packet discarding. Packet discarding may be limited to performance at an end node, e.g., a donor CU-UP or serving IAB node, using the PDB information for the access RLC channel. The limitation on packet discarding at an intermediate IAB node for a backhaul RLC channel may lead to wasted resources due to delivery of an expired packet that exceeds an end-to-end PDB at an intermediate node.

Figure 11:
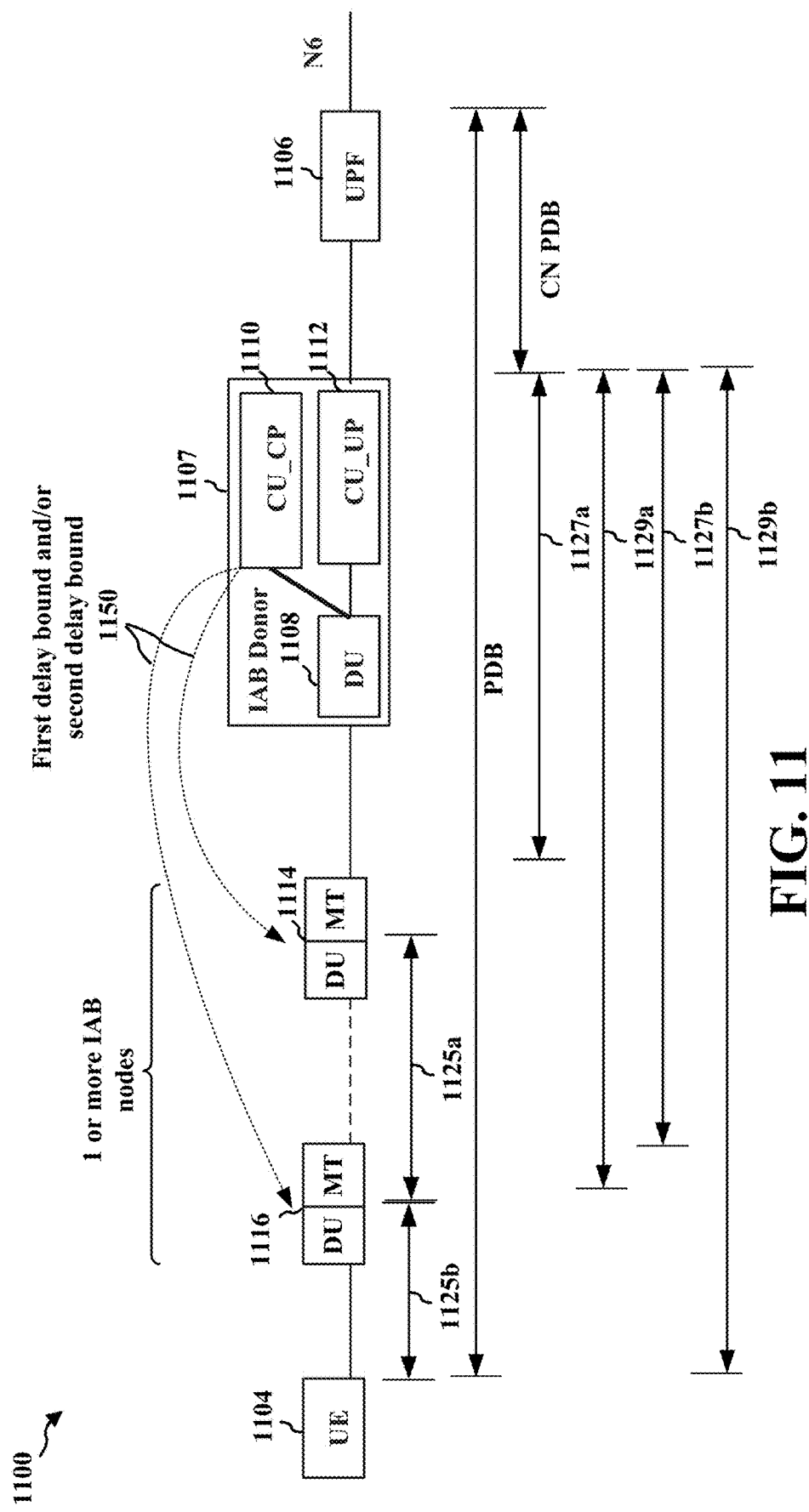
FIG. 11 illustrates example aspects of providing multiple PDB bounds to an intermediate IAB node in an IAB network.

In order to enable an IAB node to perform scheduling and discarding of packets for a backhaul RLC channel, the IAB donor CU may provide the IAB node with separate delay upper bounds for scheduling and discarding. FIG. 11 illustrates an example IAB network 1100 in which multiple delay bounds 1150 are provided to IAB nodes 1114 and 1116. Thus, the IAB donor CU (e.g., CU CP 1110 of the IAB donor 1107) may provide the IAB node multiple delay thresholds for a backhaul RLC channel. FIG. 11 also shows the DU 1108 of the IAB donor 1107. The IAB node (e.g., IAB node 1114 or 1116) may use a first delay bound (which may be referred to herein as a first delay parameter or a first delay threshold) for packet discarding and may use the second delay bound (which may be referred to herein as a second delay parameter or a second delay threshold) for scheduling decisions for the packet.

The second delay bound may be used by the IAB node DU to prioritize the packet among multiple RLC channels (e.g., including both backhaul RLC channels and access RLC channels) when making the scheduling decision.

The first delay bound can be used by the IAB node (e.g., IAB node 1114 or 1116) to determine whether to discard a packet that is being transmitted between a UPF 1106 and a UE 1104. The IAB node (e.g., IAB node 1114 or 1116) may discard the packet if the latency of the packet exceeds the first bound.

In some aspects, the latency of the packet that the IAB node uses for the discarding decision may be a latency experienced at the current hop between the current IAB node DU and the child MT or UE 1104 (e.g., the single hop latency between the IAB node DU performing the discard decision and the child MT/UE). FIG. 11 illustrates the current hop latency as 1125a for IAB node 1114 and 1125b for IAB node 1116. The IAB node 1114 may consider a total transmission time at the current hop, e.g., the latency, may include all HARQ retransmissions and RLC retransmissions up until the decision time at the current hop. Once the latency exceeds the second bound, the IAB node 1114 may discard the packet and stop transmission or retransmission of the packet.

In some aspects, the latency of the packet that the IAB node uses for the discarding decision may be a more comprehensive latency that includes the latency from previous hops, e.g., all previous hops. The IAB node may derive the latency experienced from previous hops via a time stamp carried by the packet header, e.g. at BAP header. The IAB node may compare a current time to the time stamp in order to determine the latency. The CU may create the time stamp and/or include the time stamp in the header, e.g., based on the reception of the packet at the CU UP 1112. In some examples, the IAB node may determine the latency experienced by the packet at the reception time of IAB-node, e.g. by the IAB-MT for a DL packet, or by IAB-DU for an UL packet. In this example, the latency may not include the transmission time at the current hop. FIG. 11 illustrates the previous hop latency until reception at the MT as 1127a for downlink for IAB node 1114 and 1127b for IAB node 1116. In some examples, the IAB node may determine the latency experienced by the packet up until a discarding decision time of the IAB node, e.g., including the transmission time of the current hop. FIG. 11 illustrates the previous hop latency including latency at the current hop as 1129a for downlink for IAB node 1114 and 1129b for IAB node 1116.

The determination of the latency for packet discarding based on a current hop latency or based on prior hops in combination with a current hop latency may impact the decision of the IAB node for the maximum number of HARQ transmissions and RLC transmissions at the current hop.

The first delay bound that the IAB node uses for packet discarding may have a larger value than the second delay bound used for the scheduling decision. For a backhaul RLC channel, the CU CP 1110 may have the full information on the QoS flows aggregated into this backhaul RLC channel, and it may determine the first bound for packet discarding as max (PDB—CN PDB) over all QoS flows aggregated into the backhaul RLC channels.

The donor CU (e.g., CU CP 1110) may indicate the delay bounds (e.g., the delay bounds for scheduling and discarding) to the IAB nodes via F1-AP messages and/or RRC messages.

In one example, the second delay bound can refer to the BHRLC_PDB indicated for a backhaul RLC via an F1-AP message, e.g., as illustrated in FIG. 10, and the first delay bound can be carried by a new signaling in an F1-AP or RRC message.

The donor CU may or may not indicate the first delay bound for packet discarding for a backhaul RLC channel. The function of packet discarding may not be applicable for a backhaul RLC if the first delay bound is not indicated. Thus, an IAB node may determine not to perform packet discarding if the IAB node does not receive the second delay bound. In some examples, the delay bound for packet discarding may be indicated for backhaul RLC channels dedicated for delay critical GBRs and not for other types of packets.

Figure 12:
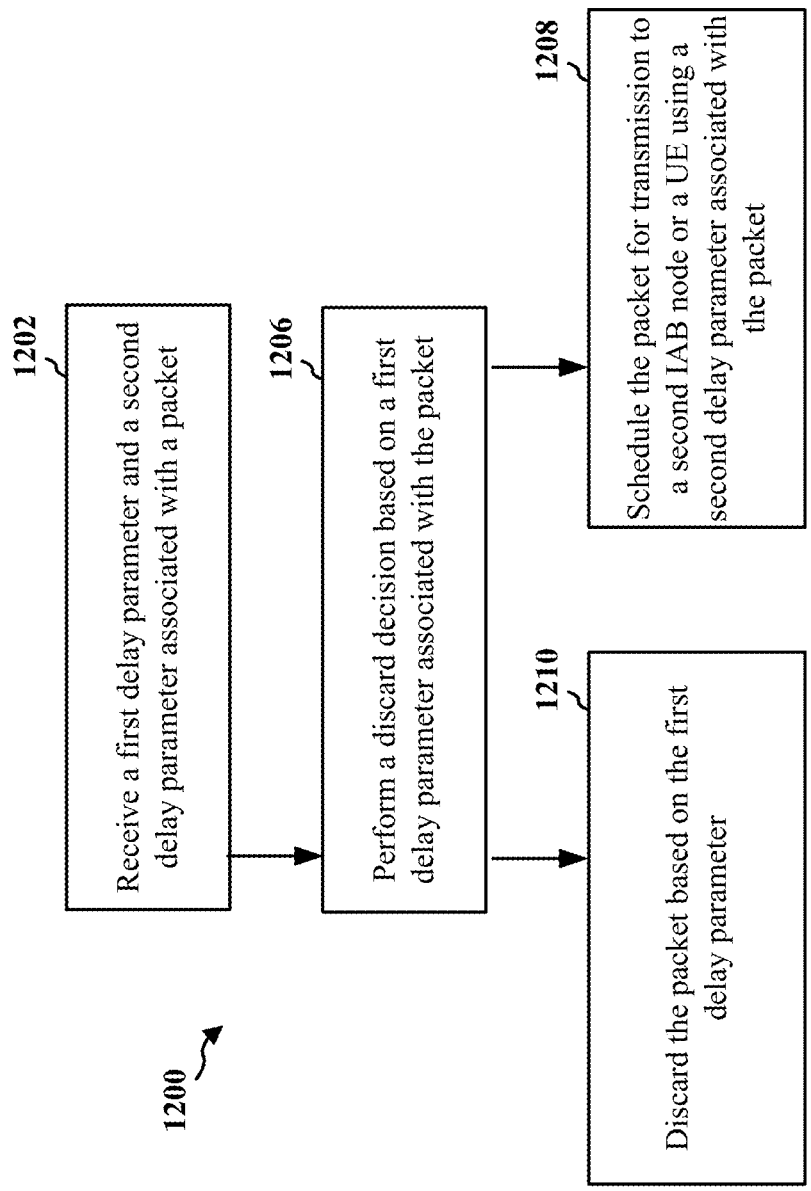
FIG. 12 is a flowchart of a method of wireless communication.

FIG. 12 is a flowchart 1200 of a method of wireless communication. The method may be performed by an IAB node or a component of an IAB node (e.g., the IAB node 103, 420, 520a, 520b, 606, 616, 618, 804, 806, 1114, or 1116; wireless device 310 or 350; the apparatus 1402). The method enables the IAB node to perform a scheduling function and a discarding function in a way that makes efficient use of wireless resources without discarding packets that may be received by a UE within a PDB.

At 1202, the IAB node receives a first delay parameter and a second delay parameter associated with a packet, the first delay parameter being associated with a discard determination for the packet and the second delay parameter being associated with scheduling the packet for transmission. The reception may be performed, e.g., by the first delay parameter component 1448 and the second delay parameter component 1450 via reception component 1430 and RF transceiver 1422 of the apparatus 1402, for example. For example, FIG. 11 illustrates an example of an IAB node 1114 or 1116 receiving the first and second delay parameters from the donor node 1107. The first delay parameter may be larger than the second delay parameter. The first delay parameter may be based on a PDB between a user plane function and the UE reduced by a core network packet delay budget, e.g., a PDB—CN PDB, for example. The first delay parameter may be indicated for an RLC channel that aggregates delay critical GBR flows. The second delay parameter may comprise a backhaul RLC PDB, for example. The second delay parameter may be received in an F1-AP message. In some aspects, the first delay parameter and the second delay parameter may be received from a donor CU.

At 1206, the IAB node performs a discard decision based on the first delay parameter associated with the packet. The IAB node discards the packet based on the first delay parameter associated with the packet or schedules the packet for transmission to a second IAB node or a UE using the second delay parameter associated with the packet. The discard decision may be performed, e.g., by the discard component 1440 of the apparatus 1402 in FIG. 14.

For example, at 1210, the UE may discard the packet based on a latency of the packet exceeding the first delay parameter. In some examples, the latency may correspond to the latency between a DU of the IAB node and a child node scheduled by the IAB node for a single hop. The child node may be a child UE or an MT of a child IAB node. FIG. 11 illustrates an example of the current hop latency as 1125a for IAB node 1114 and 1125b for IAB node 1116. In some examples, the latency may comprise the latency of one or more hops prior to the IAB node. The latency for the packet may be based on time stamp in a header of the packet.

At 1208, the IAB node schedules the packet for transmission to a second IAB node or a UE using a second delay parameter associated with the packet. For example, the IAB node may schedule the packet for transmission if the IAB node does not discard the packet based on the first delay parameter. The scheduling may be performed, e.g., by the schedule component 1444 of the communication manager 1432 in FIG. 14.

In some aspects, the method may include additional aspects described in connection with FIG. 13.

Figure 13:
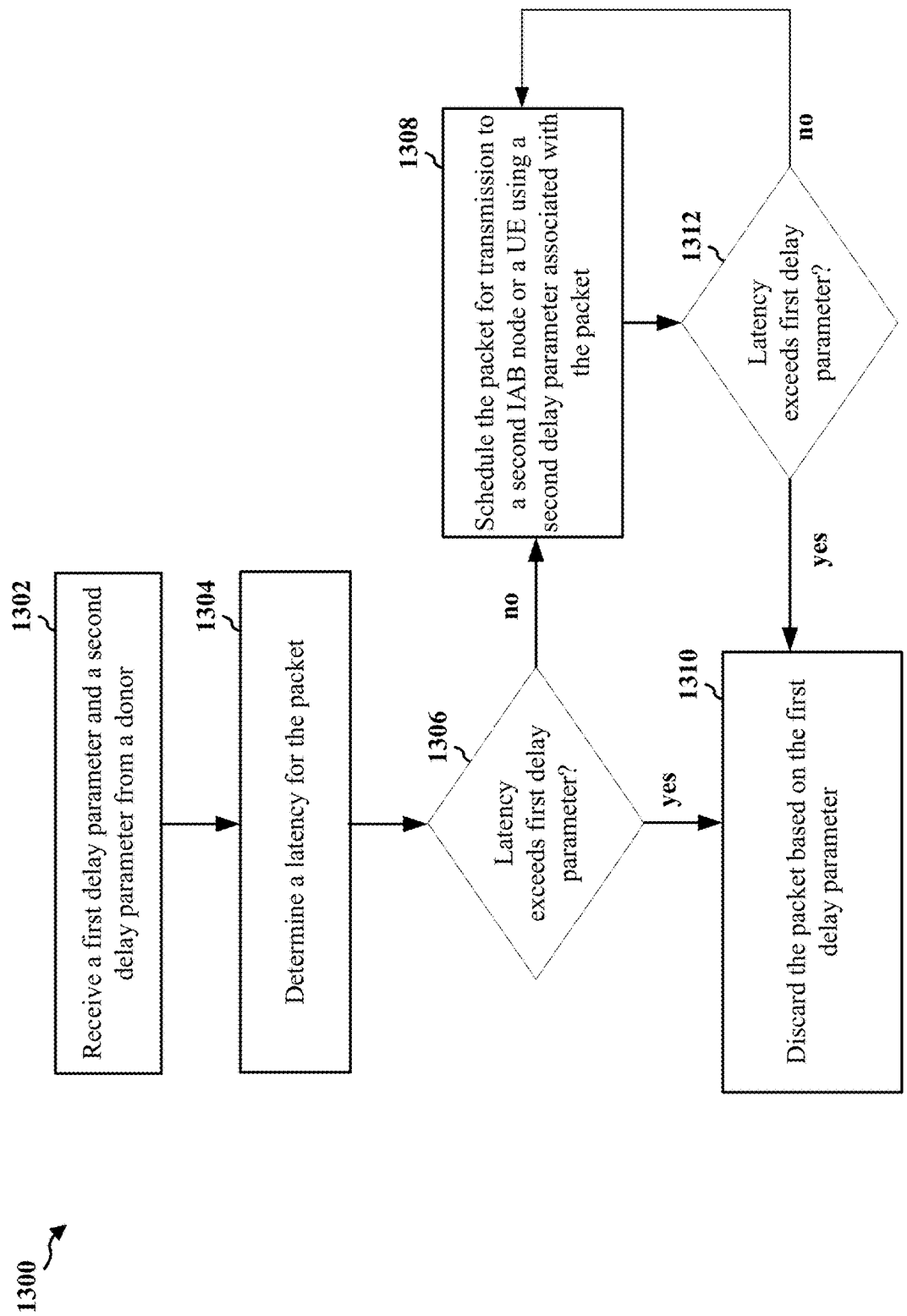
FIG. 13 is a flowchart of a method of wireless communication.

FIG. 13 is a flowchart 1300 of a method of wireless communication. The method may be performed by an IAB node or a component of an IAB node (e.g., the IAB node 103, 420, 520a, 520b, 606, 616, 618, 804, 806, 1114, or 1116; wireless device 310 or 350; the apparatus 1402).

At 1302, the IAB node may receive the first delay parameter and the second delay parameter. In some aspects, the first delay parameter and the second delay parameter may be received from a donor CU. The reception may be performed, e.g., by the first delay parameter component 1448 and the second delay parameter component 1450 via reception component 1430 and RF transceiver 1422 of the apparatus 1402, for example. For example, FIG. 11 illustrates an example of an IAB node 1114 or 1116 receiving the first and second delay parameters from the donor node 1107.

At 1306, the IAB node determines whether to discard a packet using a first delay parameter associated with the packet. The determination may be performed by the discard component 1440 of the communication manager 1432 in FIG. 14, for example. The first delay parameter may be larger than the second delay parameter. The first delay parameter may be based on a PDB between a user plane function and the UE reduced by a core network packet delay budget, e.g., a PDB—CN PDB, for example. The first delay parameter may be indicated for an RLC channel that aggregates delay critical GBR flows. The second delay parameter may comprise a backhaul RLC PDB, for example. The second delay parameter may be received in an F1-AP message.

The IAB node may determine to discard the packet when a latency of the packet exceeds the first delay parameter. In some examples, the latency may correspond to the latency between a DU of the IAB node and a child node scheduled by the IAB node for a single hop. The child node may be a child UE or an MT of a child IAB node. FIG. 11 illustrates an example of the current hop latency as 1125a for IAB node 1114 and 1125b for IAB node 1116. In some examples, the latency may comprise the latency of one or more hops prior to the IAB node. For example, at 1304, the IAB node may determine the latency for the packet from a time stamp in a header of the packet. The determination may be performed, e.g., by the latency component 1446 of the apparatus 1402 in FIG. 14. The time stamp may be included in a BAP layer header, for example. In some examples, the latency may be determined when the packet is received at the IAB node. FIG. 11 illustrates the previous hop latency until reception at the MT as 1127a for downlink for IAB node 1114 and 1127b for IAB node 1116. In some examples, the latency may include a latency of a current hop provided by the IAB node. FIG. 11 illustrates the previous hop latency including latency at the current hop as 1129a for downlink for IAB node 1114 and 1129b for IAB node 1116. In some examples, the IAB node may determine not to discard the packet if an indication of the first delay parameter is not received for the packet.

For example, at 1310, the UE discards the packet based on a latency of the packet exceeding the first delay parameter. In some examples, the latency may correspond to the latency between a DU of the IAB node and a child node scheduled by the IAB node for a single hop. The child node may be a child UE or an MT of a child IAB node. FIG. 11 illustrates an example of the current hop latency as 1125*a* for IAB node 1114 and 1125*b* for IAB node 1116. In some examples, the latency may comprise the latency of one or more hops prior to the IAB node. The latency for the packet may be based on time stamp in a header of the packet.

At 1308, the IAB node schedules the packet for transmission to a second IAB node or a UE using a second delay parameter associated with the packet. For example, the IAB node may schedule the packet for transmission if the IAB node determines not to discard the packet based on the first delay parameter. The transmission of the packet may involve a period of time, e.g., with one or more retransmissions (such as HARQ retransmission or RLC layer retransmissions). The IAB node may discard the packet and stop the transmission in the middle of a transmission process, e.g., if the latency exceeds the first delay parameter. Thus, the determination about whether to discard a packet may occur during the process of transmission, e.g., as illustrated at 1312.

Figure 14:
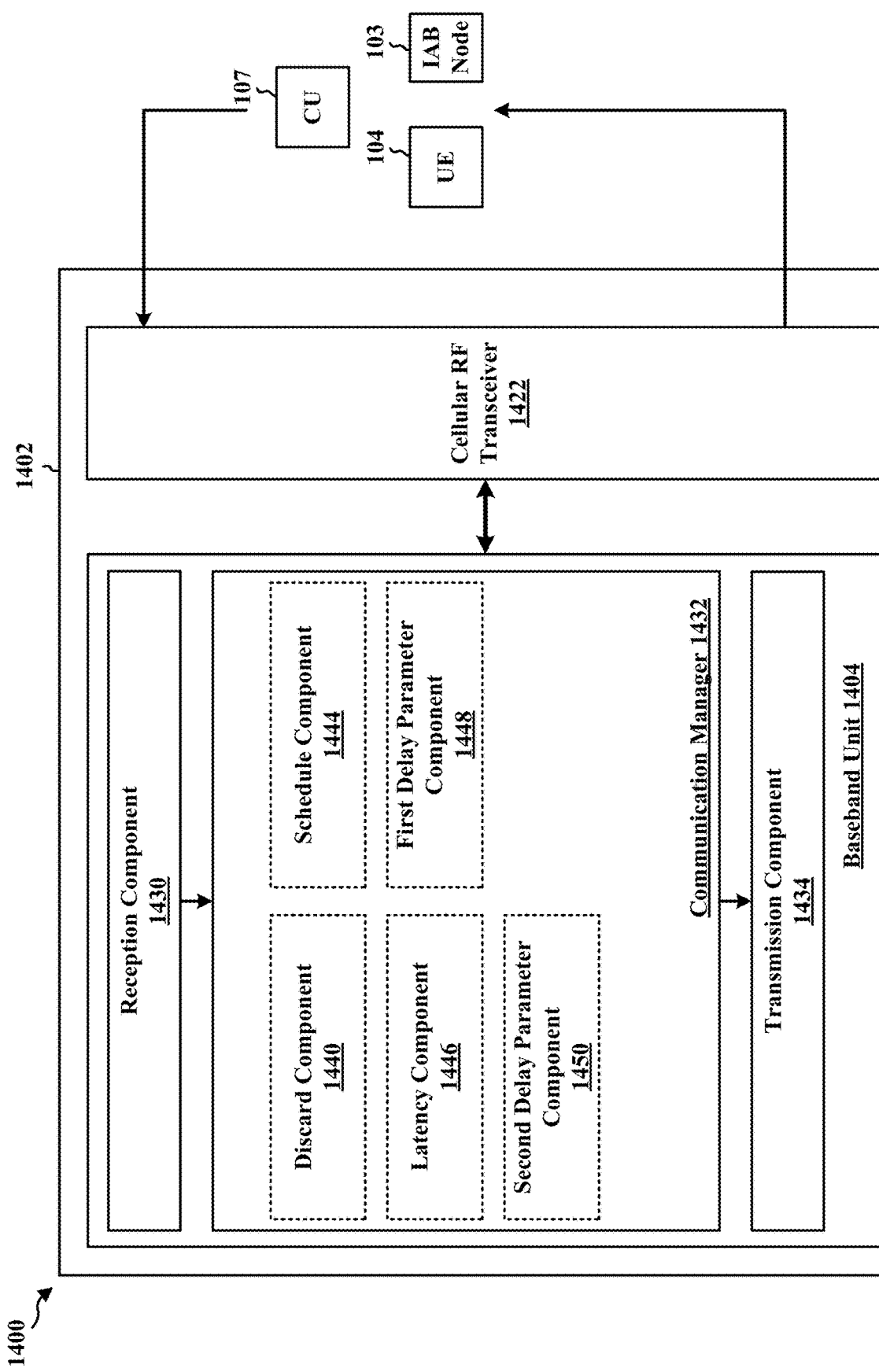
FIG. 14 is a diagram illustrating an example of a hardware implementation for an example apparatus.

The scheduling may be performed, e.g., by the schedule component 1444 of the communication manager 1432 in FIG. 14. In some examples, scheduling the packet for the transmission using the second delay parameter includes prioritizing the transmission of the packet relative to multiple RLC channels. The multiple RLC channels may include one or more backhaul RLC channels and one or more access RLC channels.

FIG. 14 is a diagram 1400 illustrating an example of a hardware implementation for an apparatus 1402. The apparatus 1402 may be an IAB node, a component of an IAB node, or may implement IAB node functionality. In some aspects, the apparatus 1402 may include a baseband unit 1404. The baseband unit 1404 may communicate through a cellular RF transceiver 1422 with the UE 104; another IAB node 103, whether a parent node or a child node; and CU 107 of a donor IAB node. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1304 to perform the various functions described herein. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the device 310 and may include the memory 376 and/or at least one of the TX processor 316, the RX processor 370, and the controller/processor 375.

The communication manger 1432 includes a first delay parameter component 1448 configured to receive a first delay parameter associated with a packet via the reception component 1430, e.g., as described in connection with 1202 and 1302. The communication manger 1432 includes a second delay parameter 1450 component configured to receive a second delay parameter associated with a packet via the reception component 1430, e.g., as described in connection with 1202 and 1302. The communication manager 1432 includes a discard component 1440 that determines whether to discard a packet using a first delay parameter associated with the packet, e.g., as described in connection with 1306 and/or to discard the packet based on the first delay parameter, e.g., as described in connection with 1210. The communication manager 1432 further includes a schedule component 1444 that schedules the packet for transmission to a second IAB node or a UE using a second delay parameter associated with the packet if the IAB node determines not to discard the packet based on the first delay parameter, e.g., as described in connection 1208 and/or 1308. The communication manager 1432 may further include a latency component 1446 that determines the latency for the packet from a time stamp in a header of the packet, e.g., as described in connection with 1304.

The apparatus may include additional components that perform each of the blocks of the algorithm in the flowcharts of FIGS. 12 and/or 13. As such, each block in the flowcharts of FIGS. 12 and/or 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for a first delay parameter and a second delay parameter associated with a packet, the first delay parameter being associated with a discard determination for the packet and the second delay parameter being associated with scheduling the packet for transmission; and means for discarding the packet based on the first delay parameter associated with the packet; and means for scheduling the packet for transmission to a second IAB node or a UE using the second delay parameter associated with the packet. The apparatus 1402 may further include means for determining whether to discard a packet using a first delay parameter associated with the packet and means for scheduling the packet for transmission to a second IAB node or a UE using a second delay parameter associated with the packet when the IAB node determines not to discard the packet based on the first delay parameter. The apparatus 1402 may further include means for determining the latency for the packet from a time stamp in a header of the packet. The means may be one or more of the components of the apparatus 1402 configured to perform the functions recited by the means. As described supra, the apparatus 1402 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 15:
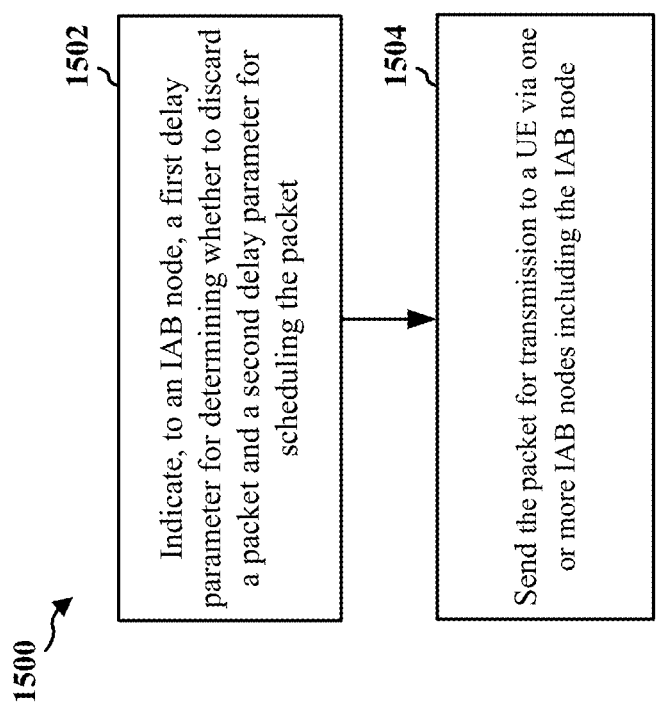
FIG. 15 is a flowchart of a method of wireless communication.

FIG. 15 is a flowchart 1500 of a method of wireless communication. The method may be performed by an IAB node CU (e.g., the CU 107, 602, 702; IAB donor node 410, 510, 810, 1107; wireless device 310 or 350; the apparatus 1602). The method enables a CU to provide parameters that enable an IAB node to perform a scheduling function and a discarding function in a way that makes efficient use of wireless resources without discarding packets that may be received by a UE within a PDB.

At 1502, the CU indicates, to an IAB node, a first delay parameter for determining whether to discard the packet and a second delay parameter for scheduling a packet. The first delay parameter may indicate for the IAB node to discard the packet if a latency of the packet exceeds the first delay parameter. The indication may be performed by the delay budget component 1640 of the communication manager 1632 in FIG. 16, for example. The first delay parameter may be larger than the second delay parameter. The first delay parameter may be based on a PDB between a user plane function and the UE reduced by a core network packet delay budget, e.g., a PDB—CN PDB, for example. The first delay parameter may be indicated for an RLC channel that aggregates delay critical GBR flows. The second delay parameter may comprise a backhaul RLC PDB, for example. The second delay parameter may be indicated in an F1-AP message.

In some examples, the latency may correspond to the latency between a DU of the IAB node and a child node scheduled by the IAB node for a single hop. The child node may be a child UE or an MT of a child IAB node. FIG. 11 illustrates an example of the current hop latency as 1125a for IAB node 1114 and 1125b for IAB node 1116. In some examples, the latency may comprise the latency of one or more hops prior to the IAB node.

In some aspects, the CU may include a time stamp in a header of the packet. The inclusion of the time stamp may be performed, e.g., by the time stamp component 1644 of the apparatus 1602 in FIG. 16. The time stamp may be included in a BAP layer header, for example. In some examples, the latency may be determined when the packet is received at the IAB node. FIG. 11 illustrates the previous hop latency until reception at the MT as 1127a for downlink for IAB node 1114 and 1127b for IAB node 1116. In some examples, the latency may include a latency of a current hop provided by the IAB node. FIG. 11 illustrates the previous hop latency including latency at the current hop as 1129a for downlink for IAB node 1114 and 1129b for IAB node 1116. In some examples, the IAB node may determine not to discard the packet if the CU does not provide an indication of the first delay parameter for the packet.

At 1504, the CU sends the packet for transmission to a UE via one or more IAB nodes including the IAB node. The packet may be sent by the transmission component 1634 of the apparatus 1602 in FIG. 16, for example.

Figure 16:
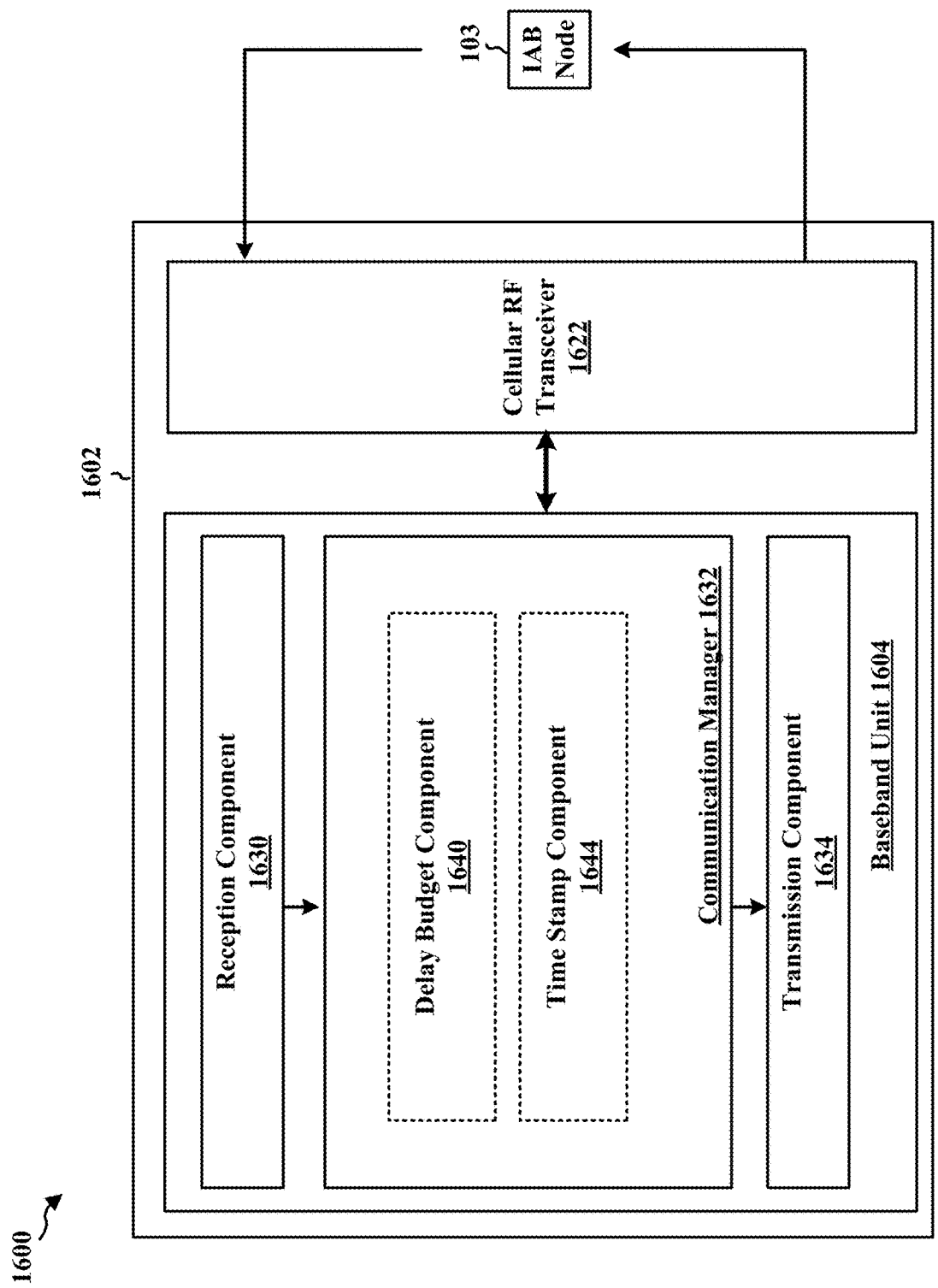
FIG. 16 is a diagram illustrating an example of a hardware implementation for an example apparatus.

FIG. 16 is a diagram 1600 illustrating an example of a hardware implementation for an apparatus 1602. The apparatus 1602 may be a CU or a donor IAB node, a component of a CU or a donor IAB node, or may perform functionality of a CU or a donor IAB node. In some aspects, the apparatus 1602 may include a baseband unit 1604. The baseband unit 1604 may communicate through a cellular RF transceiver 1622 with one or more IAB nodes 103. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described herein. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the device 310 and may include the memory 376 and/or at least one of the TX processor 316, the RX processor 370, and the controller/processor 375.

The communication manager 1632 includes a delay budget component 1640 that CU indicates, to an IAB node, a second delay parameter for scheduling a packet and a first delay parameter for determining whether to discard the packet, e.g., as described in connection with 1502. The communication manager 1632 further includes a time stamp component 1644 that includes a time stamp in a header of a packet, e.g., as described in connection with 1506. The transmission component 1634 sends the packet for transmission to a UE via one or more IAB nodes including the IAB node, e.g., as described in connection with 1504.

The apparatus may include additional components that perform each of the blocks of the algorithm in the flowchart of FIG. 15. As such, each block in the flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1602 may include a variety of components configured for various functions. In one configuration, the apparatus 1602, and in particular the baseband unit 1604, includes means for indicating, to an IAB node, a first delay parameter for determining whether to discard the packet and a second delay parameter for scheduling a packet. The apparatus 1602 may further include means for sending the packet for transmission to a UE via one or more IAB nodes including the IAB node. The apparatus 1602 may further include means for including a time stamp in a header of the packet. The means may be one or more of the components of the apparatus 1602 configured to perform the functions recited by the means. As described supra, the apparatus 1602 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with aspects of other examples or teachings described herein, without limitation.

Aspect 1 is a method of wireless communication at an IAB node, comprising: determining, using a first delay parameter, whether to discard a packet; and scheduling the packet for transmission to a second IAB node or a UE using a second delay parameter associated with the packet.

In aspect 2, the method of aspect 1 further includes that scheduling the packet for the transmission using the second delay parameter includes prioritizing the transmission of the packet relative to multiple RLC channels.

In aspect 3, the method of aspect 1 or aspect 2 further includes that the multiple RLC channels include one or more backhaul RLC channels and one or more access RLC channels.

In aspect 4, the method of any of aspects 1-3 further includes that the IAB node determines to discard the packet when a latency of the packet exceeds the first delay parameter.

In aspect 5, the method of any of aspects 1-4 further includes that the latency corresponds to the latency between a DU of the IAB node and a child node scheduled by the IAB node for a single hop.

In aspect 6, the method of any of aspects 1-5 further includes that the latency comprises the latency of one or more hops prior to the IAB node.

In aspect 7, the method of any of aspects 1-6 further includes determining the latency for the packet from a time stamp in a header of the packet.

In aspect 8, the method of any of aspects 1-7 further includes that the time stamp is included in a BAP layer header.

In aspect 9, the method of any of aspects 1-8 further includes that the latency is determined when the packet is received at the IAB node.

In aspect 10, the method of any of aspects 1-9 further includes that the latency includes the latency of a current hop provided by the IAB node.

In aspect 11, the method of any of aspects 1-10 further includes that the first delay parameter is larger than the second delay parameter.

In aspect 12, the method of any of aspects 1-11 further includes that the first delay parameter is based on a PDB between a user plane function and the UE reduced by a core network packet delay budget.

In aspect 13, the method of any of aspects 1-12 further includes receiving the first delay parameter and the second delay parameter from a donor CU.

In aspect 14, the method of any of aspects 1-13 further includes that the second delay parameter comprises a backhaul RLC PDB and is received in an F1-AP message.

In aspect 15, the method of any of aspects 1-14 further includes that the IAB node determines not to discard the packet if an indication of the first delay parameter is not received for the packet.

In aspect 16, the method of any of aspects 1-15 further includes that the first delay parameter is indicated for an RLC channel that aggregates delay critical GB flows Aspect 17 is a device including one or more processors and one or more memories in electronic communication with the one or more processors storing instructions executable by the one or more processors to cause the device to implement a method as in any of aspects 1-16.

Aspect 18 is a system or apparatus including means for implementing a method or realizing an apparatus as in any of aspects 1-16.

Aspect 19 is a non-transitory computer readable medium storing instructions executable by one or more processors to cause the one or more processors to implement a method as in any of aspects 1-16.

Aspect 20 is a method of wireless communication at a CU of an IAB network, comprising: indicating, to an IAB node, a first delay parameter for determining whether to discard a packet and a second delay parameter for scheduling the packet; and sending the packet for transmission to a UE via one or more IAB nodes including the IAB node.

In aspect 21, the method of aspect 20 further includes that the first delay parameter indicates for the IAB node to discard the packet if a latency of the packet exceeds the first delay parameter.

In aspect 22, the method of aspect 20 or aspect 21 further includes that the latency corresponds to the latency between a DU of the IAB node and a child node scheduled by the IAB node for a single hop.

In aspect 23, the method of any of aspects 20-22 further includes that the latency comprises the latency of one or more hops prior to the IAB node.

In aspect 24, the method of any of aspects 20-23 further includes including a time stamp in a header of the packet.

In aspect 25, the method of any of aspects 20-24 further includes that the time stamp is included in a BAP layer header.

In aspect 26, the method of any of aspects 20-25 further includes that the second delay parameter is larger than the first delay parameter.

In aspect 27, the method of any of aspects 20-26 further includes that the first delay parameter is based on a PDB between a user plane function and the UE reduced by a core network packet delay budget.

In aspect 28, the method of any of aspects 20-27 further includes that the first delay parameter comprises a backhaul RLC PDB and is indicated in an F1-AP message.

In aspect 29, the method of any of aspects 20-28 further includes that the first delay parameter is indicated for an RLC channel that aggregates delay critical GBR flows.

Aspect 30 is a device or apparatus including one or more processors and one or more memories in electronic communication with the one or more processors storing instructions executable by the one or more processors to cause the device to implement a method as in any of aspects 20-29.

In aspect 31, the device or apparatus of aspect 30 further comprises: at least one antenna and a transceiver coupled to the at least one antenna and the one or more processors.

Aspect 32 is a system or apparatus including means for implementing a method or realizing an apparatus as in any of aspects 20-29.

In aspect 33, the system or apparatus of aspect 32 further comprises: at least one antenna and a transceiver coupled to the at least one antenna.

Aspect 34 is a non-transitory computer readable medium storing instructions executable by one or more processors to cause the one or more processors to implement a method as in any of aspects 20-29.

Aspect 35 is a method of wireless communication at a first IAB node, comprising: receiving a first delay parameter and a second delay parameter associated with a packet, the first delay parameter being associated with a discard determination for the packet and the second delay parameter being associated with scheduling the packet for transmission; performing a discard decision based on the first delay parameter associated with the packet; and scheduling the packet for transmission to a second IAB node or a UE using the second delay parameter associated with the packet.

In aspect 36, the method of aspect 35 further includes scheduling the packet for the transmission to the second IAB node using the second delay parameter associated with the packet including prioritization of the transmission of the packet relative to multiple RLC channels.

In aspect 37, the method of aspect 36 further includes that the multiple RLC channels include one or more backhaul RLC channels and one or more access RLC channels.

In aspect 38, the method of any of aspects 35-37 further includes the discard decision is based on whether a latency of the packet exceeds the first delay parameter.

In aspect 39, the method of aspect 38 further includes that the latency corresponds to the latency between a DU of the first IAB node and a child node scheduled by the first IAB node for a single hop.

In aspect 40, the method of aspect 38 further includes that the latency comprises the latency of one or more hops prior to the first IAB node.

In aspect 41, the method of aspect 40 further includes that the latency for the packet is based on a time stamp in a header of the packet.

In aspect 42, the method of aspect 41 further includes that the time stamp is included in a BAP layer header.

In aspect 43, the method of any of aspects 40-41 further includes that the latency is based on reception of the packet at the first IAB node.

In aspect 44, the method of aspect 38 further includes that the latency includes the latency of a current hop provided by the first IAB node.

In aspect 45, the method of any of aspects 35-44 further includes that the first delay parameter is larger than the second delay parameter.

In aspect 46, the method of any of aspects 35-44 further includes that the first delay parameter is based on a PDB between a user plane function and the UE reduced by a core network packet delay budget.

In aspect 47, the method of any of aspects 35-46 further includes that the first delay parameter and the second delay parameter are from a donor CU.

In aspect 48, the method of any of aspects 35-47 further includes that the second delay parameter comprises a backhaul RLC PDB indicated in an F1-AP message.

In aspect 49, the method of any of aspects 35-48 further includes skipping a discard of a second packet based on an indication of the first delay parameter not being received for the second packet.

In aspect 50, the method of any of aspects 35-49 further includes that the first delay parameter is indicated for an RLC channel that aggregates delay critical GBR flows.

Aspect 51 is an apparatus comprising memory and at least one processor, the memory and the at least one processor are configured to perform the method of any of aspects 35-50.

In aspect 52, the apparatus of aspect 51 further comprises: at least one antenna and a transceiver coupled to the at least one antenna and the at least one processor.

Aspect 53 is an apparatus including means for implementing a method or realizing an apparatus as in any of aspects 35-50.

In aspect 54, the system or apparatus of aspect 53 further comprises: at least one antenna and a transceiver coupled to the at least one antenna.

Aspect 55 is a non-transitory computer readable medium storing instructions executable by one or more processors to cause the one or more processors to implement a method as in any of aspects 35-50.

What is claimed is:

1. An apparatus for wireless communication at a first Integrated Access and Backhaul (IAB) node as an intermediate node in a multiple hop path between a donor central unit (CU) and a serving IAB node providing an access radio link channel (RLC) to a user equipment (UE), comprising:
   memory; and
   at least one processor coupled to the memory and configured to cause the apparatus to:
      receive, from the donor CU, a first packet delay budget (PDB) parameter corresponding to an end-to-end PDB for a packet to the UE, and a second PDB parameter corresponding to a one hop PDB for the packet to the UE, the first PDB parameter for the packet being based on the end-to-end PDB between a user plane function and the UE, and the second PDB parameter indicating a backhaul radio link control (RLC) PDB for a single hop of the packet, the first PDB parameter being associated with a discard determination for the packet and the second PDB parameter being associated with scheduling the packet for transmission;
      perform, at the first IAB node, a discard decision about whether to discard the packet based on the first PDB parameter corresponding to the end-to-end PDB associated with the packet; and
      schedule, at the first IAB node, the packet for the transmission to a second IAB node using the second PDB parameter corresponding to the one hop PDB associated with the packet.

2. The apparatus of claim 1, wherein the at least one processor is configured to cause the apparatus to schedule the packet for the transmission to the second IAB node using the second PDB parameter corresponding to the one hop PDB associated with the packet including prioritization of the transmission of the packet relative to multiple radio link control (RLC) channels when the discard decision indicates not to discard the packet based on the first PDB parameter corresponding to the end-to-end PDB.

3. The apparatus of claim 2, wherein the multiple RLC channels include one or more backhaul RLC channels and one or more access RLC channels.

4. The apparatus of claim 1, wherein the discard decision is based on whether a latency of the packet exceeds the first PDB parameter corresponding to the end-to-end PDB.

5. The apparatus of claim 4, wherein the latency corresponds to the latency between a distributed unit (DU) of the first IAB node and a child node scheduled by the first IAB node for the single hop.

6. The apparatus of claim 4, wherein the latency comprises the latency of one or more hops prior to the first IAB node.

7. The apparatus of claim 6, wherein the latency for the packet is based on a time stamp in a header of the packet.

8. The apparatus of claim 7, wherein the time stamp is included in a backhaul adaptation protocol (BAP) layer header.

9. The apparatus of claim 7, wherein the latency is based on reception of the packet at the first IAB node.

10. The apparatus of claim 6, wherein the latency includes the latency of a current hop provided by the first IAB node.

11. The apparatus of claim 1, wherein the first PDB parameter is larger than the second PDB parameter.

12. The apparatus of claim 1, wherein the first PDB parameter is based on the end-to-end PDB between the user plane function and the UE reduced by a core network PDB.

13. The apparatus of claim 1, wherein the second PDB parameter is indicated in an F1-AP message.

14. The apparatus of claim 1, wherein the at least one processor is configured to cause the apparatus to skip discard of a second packet based on an indication of the first PDB parameter not being received for the second packet.

15. The apparatus of claim 1, wherein the first PDB parameter is indicated for a radio link control (RLC) channel that aggregates delay critical guaranteed bit rate (GBR) flows.

16. The apparatus of claim 1, further comprising:
an antenna; and
a transceiver coupled to the antenna and the at least one processor.

17. The apparatus of claim 1, wherein the first PDB parameter is a multiple hop between the CU and the UE of the packet that includes multiple intermediate IAB nodes.

18. The apparatus of claim 1, wherein the first PDB parameter and the second PDB parameter are for different determinations for a same packet, the different determinations including the discard decision and a scheduling decision.

19. A method of wireless communication at a first Integrated Access and Backhaul (IAB) node as an intermediate node in a multiple hop path between a donor central unit (CU) and a serving IAB node providing an access radio link channel (RLC) to a user equipment (UE), comprising:
receiving, from the donor CU, a first packet delay budget (PDB) parameter corresponding to an end-to-end PDB for a packet to the UE, and a second PDB parameter corresponding to a one hop PDB for the packet to the UE, the first PDB parameter for the packet being based on the end-to-end PDB between a user plane function and the UE, and the second PDB parameter indicating a backhaul radio link control (RLC) PDB for a single hop of the packet, the first PDB parameter being associated with a discard determination for the packet and the second PDB parameter being associated with scheduling the packet for transmission;
performing, at the first IAB node, a discard decision about whether to discard the packet based on the first PDB parameter corresponding to the end-to-end PDB associated with the packet; and
scheduling, at the first IAB node, the packet for the transmission to a second IAB node using the second PDB parameter corresponding to the one hop PDB associated with the packet.

20. An apparatus of wireless communication at a central unit (CU) of an integrated access and backhaul (IAB) network, comprising:
memory; and
at least one processor coupled to the memory and configured to cause the apparatus to:
indicate, from the CU to an IAB node, a first PDB parameter corresponding to an end-to-end PDB for a packet and a second PDB parameter corresponding to a one hop PDB for the packet, the first PDB parameter for the packet being based on the end-to-end PDB between a user plane function and a user equipment (UE), and the second PDB parameter indicating a backhaul radio link control (RLC) PDB for a single hop of the packet, the first PDB parameter being for the IAB node to determine whether to discard the packet, and the second PDB parameter being for the IAB node to schedule the packet; and
send the packet for transmission to the UE via one or more IAB nodes including the IAB node.

21. The apparatus of claim 20, further comprising:
an antenna; and
a transceiver coupled to the antenna and the at least one processor.

22. The apparatus of claim 20, wherein the first PDB parameter indicates for the IAB node to discard the packet if a latency of the packet exceeds the first PDB parameter corresponding to the end-to-end PDB.

23. The apparatus of claim 22, wherein the latency corresponds to the latency between a distributed unit (DU) of the IAB node and a child node scheduled by the IAB node for the single hop.

24. The apparatus of claim 22, wherein the latency comprises the latency of one or more hops prior to the IAB node.

25. The apparatus of claim 20, wherein the at least one processor is further configured to cause the apparatus to:
include a time stamp in a header of the packet.

26. The apparatus of claim 25, wherein the time stamp is included in a backhaul adaptation protocol (BAP) layer header.

27. The apparatus of claim 21, wherein the first PDB parameter is larger than the second PDB parameter.

28. The apparatus of claim 21, wherein the first PDB parameter is based on the end-to-end PDB between the user plane function and the UE reduced by a core network packet delay budget.

29. The apparatus of claim 21, wherein the memory and the at least one processor are configured to indicate the second PDB parameter in an F1-AP message.

30. The apparatus of claim 21, wherein the at least one processor is configured to indicate the first PDB parameter for a radio link control (RLC) channel that aggregates delay critical guaranteed bit rate (GBR) flows.

31. A method of wireless communication at a central unit (CU) of an integrated access and backhaul (IAB) network, comprising:

indicating, from the CU to an IAB node, a first PDB parameter corresponding to an end-to-end PDB for a packet and a second PDB parameter corresponding to a one hop PDB for the packet, the first PDB parameter for the packet being based on the end-to-end PDB between a user plane function and a user equipment (UE), and the second PDB parameter indicating a backhaul radio link control (RLC) PDB for a single hop of the packet, the first PDB parameter being for the IAB node to determine whether to discard the packet, and the second PDB parameter being for the IAB node to schedule the packet; and sending the packet for transmission to the UE via one or more IAB nodes including the IAB node.

\* \* \* \* \*